United States Patent
Yin et al.

(10) Patent No.: US 10,985,877 B2
(45) Date of Patent: Apr. 20, 2021

(54) CODEBOOK DETERMINATION OF HARQ-ACK MULTIPLEXING WITH FALLBACK DOWNLINK CONTROL INFORMATION (DCI) AND CODE BLOCK GROUP (CBG) CONFIGURATIONS

(71) Applicants: Sharp Kabushiki Kaisha, Sakai (JP); FG Innovation Company Limited, Hong Kong (CN)

(72) Inventors: Zhanping Yin, Vancouver, WA (US); Toshizo Nogami, Chiba (JP); Tatsushi Aiba, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 16/191,932

(22) Filed: Nov. 15, 2018

(65) Prior Publication Data
US 2019/0149271 A1    May 16, 2019

Related U.S. Application Data

(63) Continuation of application No. PCT/US2018/061122, filed on Nov. 14, 2018.

(60) Provisional application No. 62/587,332, filed on Nov. 16, 2017.

(51) Int. Cl.
*H04L 12/28* (2006.01)
*H04L 1/18* (2006.01)
*H04L 5/00* (2006.01)
*H04W 88/02* (2009.01)
*H04W 72/04* (2009.01)
*H04L 1/16* (2006.01)

(52) U.S. Cl.
CPC .......... *H04L 1/1816* (2013.01); *H04L 1/1607* (2013.01); *H04L 1/1825* (2013.01); *H04L 1/1861* (2013.01); *H04L 5/0055* (2013.01); *H04W 72/042* (2013.01); *H04W 72/0446* (2013.01); *H04W 72/0453* (2013.01); *H04W 88/023* (2013.01); *H04L 5/001* (2013.01)

(58) Field of Classification Search
CPC ...................................................... H04L 12/28
USPC ........................................................ 370/329
See application file for complete search history.

(56) References Cited

U.S. PATENT DOCUMENTS

| | | |
|---|---|---|
| 2010/0165939 A1 | 7/2010 | Lin |
| 2011/0310823 A1 | 12/2011 | Nam et al. |
| 2012/0034927 A1 | 2/2012 | Papasakellariou et al. |
| 2013/0242816 A1 | 9/2013 | He et al. |

(Continued)

FOREIGN PATENT DOCUMENTS

WO    2017030489 A1    2/2017

OTHER PUBLICATIONS

International Search Report and Written Opinion issued for PCT Application No. PCT/US2018/061122 dated Jan. 22, 2019.

*Primary Examiner* — Dang T Ton
(74) *Attorney, Agent, or Firm* — Austin Rapp

(57) ABSTRACT

A user equipment (UE) is described. The UE includes a processor and memory in electronic communication with the processor. Instructions stored in the memory are executable to determine a HARQ-ACK codebook size for multiple slots on a single carrier (CC) or one or more slots on multiple carriers. The instructions are also executable to send a single HARQ-ACK report for the multiple slots based on the HARQ-ACK codebook size.

4 Claims, 18 Drawing Sheets

(56) References Cited

U.S. PATENT DOCUMENTS

| | | |
|---|---|---|
| 2013/0308612 A1 | 11/2013 | Cai et al. |
| 2015/0131494 A1 | 5/2015 | He et al. |
| 2015/0236828 A1 | 8/2015 | Park et al. |
| 2016/0302182 A1 | 10/2016 | Nogami et al. |
| 2019/0313401 A1* | 10/2019 | Wang ................ H04W 72/0413 |

* cited by examiner

Case 2: Multiple DL transmissions on one or more CCs are linked to a single PUCCH/PUSCH reporting

CODEBOOK DETERMINATION OF HARQ-ACK MULTIPLEXING WITH FALLBACK DOWNLINK CONTROL INFORMATION (DCI) AND CODE BLOCK GROUP (CBG) CONFIGURATIONS

RELATED APPLICATIONS

This application is related to and claims priority from U.S. Provisional Patent Application No. 62/587,332, entitled "CODEBOOK DETERMINATION OF HARQ-ACK MULTIPLEXING WITH FALLBACK DOWNLINK CONTROL INFORMATION (DCI) AND CODE BLOCK GROUP (CBG) CONFIGURATIONS," filed on Nov. 16, 2017, which is hereby incorporated by reference herein, in its entirety.

TECHNICAL FIELD

The present disclosure relates generally to communication systems. More specifically, the present disclosure relates to codebook determination of HARQ-ACK multiplexing with fallback downlink control information (DCI) and code block group (CBG) configurations.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
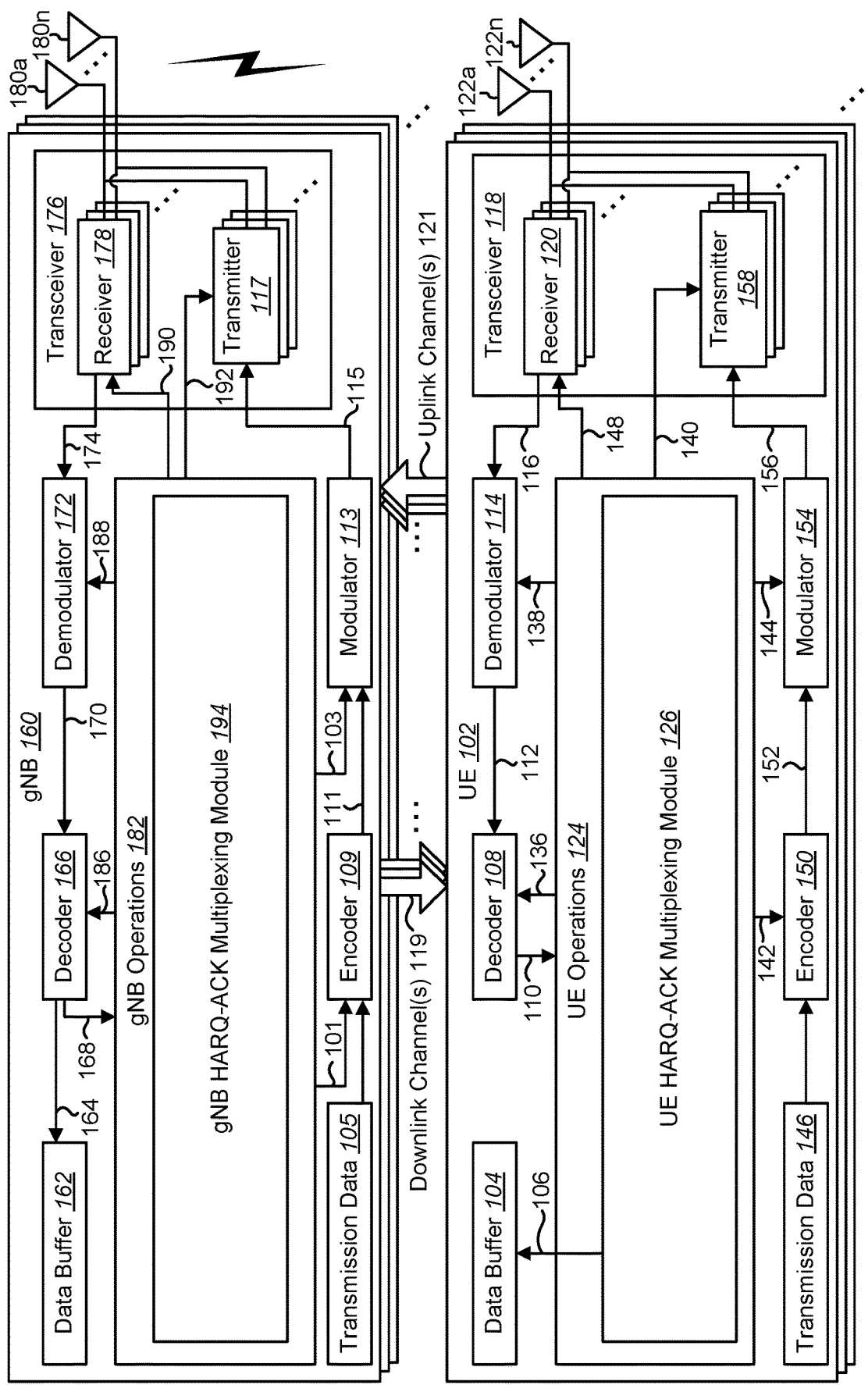
FIG. 1 is a block diagram illustrating one implementation of one or more base stations (gNBs) and one or more user equipments (UEs) in which systems and methods for codebook determination of HARQ-ACK multiplexing with fallback downlink control information (DCI) and code block group (CBG) configurations may be implemented.

A user equipment (UE) is described. The UE includes a processor and memory in electronic communication with the processor. Instructions stored in the memory are executable to determine a HARQ-ACK codebook size for multiple slots on a single carrier (CC) or one or more slots on multiple carriers. The instructions are also executable to send a single HARQ-ACK report for the multiple slots based on the HARQ-ACK codebook size.

A counter downlink assignment indicator (DAI) may indicate an accumulated number of HARQ-ACK bits, and a total DAI indicates the total number of HARQ-ACK bits to be reported in a single UL reporting on PUCCH or PUSCH. The number of HARQ-ACK bits may accommodate multiple HARQ-ACK bits for code block groups (CBGs) of each transport block (TB) if CBG is configured for a CC. The number of HARQ-ACK bits may accommodate multiple HARQ-ACK bits for each transport block (TB) if CBG is not configured for a CC. The number of bits for the counter DAI and total DAI may be greater than 2 bits (e.g., 3 or 4 bits).

The number of HARQ-ACK bits to be reported for each downlink (DL) transmission (no_HARQ-ACK_perDLTx) in a slot/mini-slot is configured by higher layer signaling.

The number of HARQ-ACK bits to be reported for each DL transmission (no_HARQ-ACK_perDLTx) in a slot/mini-slot may be determined implicitly based on existing CBG configurations of each cell.

In a case of dynamic HARQ-ACK codebook size determination, the number of HARQ-ACK bits in a UL transmission may be determined based on a total DAI and a no_HARQ-ACK_perDLTx parameter. A counter DAI may indicate an accumulated number of slots or mini-slots, and a total DAI may indicate the total number of slots or mini-slots to be reported in a single UL reporting on PUCCH or PUSCH. The number of bits for counter DAI and total DAI may be 2 bits.

With a semi-static HARQ-ACK codebook, the HARQ-ACK codebook size may be determined based at least on a configured number of DL cells, a maximum number of TBs based on configuration for each DL cell, the configured number of CBGs per TB per configured DL cell, and a no_HARQ-ACK_perDLTx parameter.

If a configured or determined number of HARQ-ACK bits to be reported for each DL transmission (no_HARQ-ACK_perDLTx) is smaller than the number of HARQ-ACK bits reported for a DL transmission of a cell based on the CBG configuration, HARQ-ACK bit bundling is performed on the DL transmission of the cell before HARQ-ACK multiplexing.

If a configured or determined number of HARQ-ACK bits to be reported for each DL transmission (no_HARQ-ACK_perDLTx) is larger than the number of HARQ-ACK bits reported for a DL transmission of a cell based on the CBG configuration, HARQ-ACK bit expansion may be performed before HARQ-ACK multiplexing.

If CBG is configured, and if more than one DL transmission is detected on any cell or if at least one DL transmission is detected on a secondary cell (SCell), HARQ-ACK multiplexing may be applied. Fallback DCI may be treated the same as a regular DCI, and a CBG level is reported regardless of DCI formats.

If CBG is configured, and if more than one DL transmission is detected on any cell or if at least one DL transmission is detected on an SCell, HARQ-ACK multiplexing may be applied. A fallback operation may be applied to the DL transmission scheduled with a fallback DCI and a TB level HARQ-ACK may be generated for the given DL transmission. The TB level HARQ-ACK may be expanded to the configured HARQ-ACK bits for the given CC to keep the same HARQ-ACK codebook size as a semi-static configuration.

A fallback DCI can override regular DCI. Fallback operation may be used if the UE detects at least one fallback DCI on any CC. TB level HARQ-ACK may be used on all DL transmissions from all CCs if the UE detects at least one fallback DCI on any CCs. If at least one serving cell is configured with the CBG transmission ON, if the UE detects at least one fallback DCI format, the UE may generate HARQ-ACK information bit(s) only for a transport block for PDSCH reception(s) on the serving cell(s). If the UE misses at least one DCI for a DL transmission, TB level HARQ-ACK may be used on all DL transmissions from all CCs. If there is no fallback DCI detected and there is at least one missed DCI, the UE may assume a regular DCI format is used in a missing DCI, and performs HARQ-ACK normally based on CBG level HARQ-ACK feedback.

If CBG is configured, and if more than one DL transmission is detected on any cell or if at least one DL transmission is detected on a SCell, HARQ-ACK multiplexing may be applied. A fallback operation may be applied to a DL transmission scheduled with a fallback DCI. TB level HARQ-ACK may be generated for the given DL transmission. The TB level HARQ-ACK may be expanded to the configured HARQ-ACK bits for the given CC to keep the same HARQ-ACK codebook size as regular DCI scheduling.

If the number of HARQ-ACK bits are indicated in a counter DAI and total DAI, a fallback operation reduces the HARQ-ACK codebook size dynamically. Even if some DAI is missed, the UE may pad NACK to the corresponding bits in the HARQ-ACK codebook.

The number of HARQ-ACK bits to be reported for each DL transmission (no_HARQ-ACK_perDLTx) in a slot/min-slot may be configured separately.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. A new radio base station may be referred to as a gNB. A gNB may also be more generally referred to as a base station device.

In NR, the HARQ-ACK reporting timing is more flexible than in earlier technologies (e.g., LTE). For example, a UE can be configured to report multiple slots in a single PUCCH report including multiple slots on a single carrier (also referred to as a component carrier (CC)) and/or slots in multiple carriers.

Furthermore, each carrier may have different code block group (CBG) configurations. On a carrier with a CBG configuration, fallback downlink control information (DCI) or regular (also referred to as normal) DCI may be used for downlink (DL) assignments. These factors make HARQ-ACK codebook determination very complicated. Moreover, both semi-static and dynamic codebook size may be supported.

The described systems and methods provide some approaches and conditions for HARQ-ACK codebook determination. The described systems and methods may be especially beneficial when a dynamic codebook size is applied.

The described systems and methods may apply to a case of HARQ-ACK multiplexing of multiple slots on the same or different CCs, and for dynamic and/or semi-static codebook determination. In the case of a different number of code block groups (CBGs) on different CCs, a parameter may be configured on the number of HARQ-ACK bits for each slot or a transport block (TB). The new parameter may override the CBG configurations on different CCs for HARQ-ACK reporting. If at least one fallback DCI is detected on any CC, transport block (TB) level HARQ-ACK may be applied to all CCs and slots.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which codebook determination of HARQ-ACK multiplexing with fallback downlink control information (DCI) and code block group (CBG) configurations may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH and a PUSCH, etc. The one or more gNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE HARQ-ACK multiplexing module 126.

In NR, multiple OFDM numerologies are supported as given by Table 1, where $\mu$ and the cyclic prefix for a carrier bandwidth part are given by the higher-layer parameters DL-BWP-mu and DL-BWP-cp for the downlink and UL-BWP-mu and UL-BWP-cp for the uplink.

TABLE 1

| $\mu$ | $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |

NR also supports code block group (CBG). If CBG is configured, HARQ-ACK may be reported at the CBG level. In a single codeword (CW) configuration, the maximum configurable number of CBGs per transport block (TB) is 8. The possible maximum number of CBGs per TB is 2, 4, 6, or 8.

In a multiple CW configuration, the maximum configurable number of CBGs per TB is 4. In a multiple CW configuration, the configured maximum number of CBGs per TB is the same between TBs.

Even if a UE 102 is configured with CBG based retransmission, for the PDSCH scheduled by PDCCH using fallback DCI, TB level HARQ-ACK feedback is used at least for the case without HARQ-ACK multiplexing. This means that fallback downlink control information (DCI) does not support CBG level HARQ-ACK feedback.

HARQ-ACK reporting timing and HARQ-ACK multiplexing is described herein. The timing between DL data transmission and acknowledgement may be determined based on 0 or 2 bits in DCI. For both slot and non-slot scheduling, the timing provides the indication to determine the slot and the symbol(s) for the HARQ-ACK transmission.

In 3GPP Release-15, for a UE 102, only one active bandwidth part (BWP) is supported on both DL and UL. The active BWP may be switched by dynamic signaling or based on a timer. Note that DL transmissions in the slots or mini-slots may be on the same bandwidth part (BWP) of a CC or different BWPs of the CC. The HARQ-ACK feedback should be reported on a PUCCH of the PCell or PSCell of a PUCCH group, or on a PUSCH. A PUCCH group is formed by one or more CCs that report UCI on a common PUCCH reporting cell (e.g., a PCell or PSCell). In NR, up to two PUCCH groups may be supported, similar to dual connectivity in LTE where two cell groups may be supported.

For a single DL data transmission, the HARQ-ACK bit(s) may be reported on a PUCCH or PUSCH according to the indicated timing. Similarly, the HARQ-ACK bits of multiple slot(s) or mini-slot(s) may be reported on a PUCCH or PUSCH if the indicated timings of these slot(s) or mini-slot(s) point to the same PUCCH or PUSCH resource and transmission.

In NR, the HARQ-ACK reporting timing is more flexible. For example, a UE 102 can be configured to report multiple slots in a single PUCCH report. In a first case (Case 1), HARQ-ACK multiplexing may be performed for multiple slots or mini-slots on a single carrier (CC). In a second case (Case 2), HARQ-ACK multiplexing may be performed for slots or mini-slots on multiple carriers (CCs) (e.g., carrier aggregation). An example of HARQ-ACK multiplexing of multiple DL transmissions according to Case 1 is described in connection with FIG. 2. An example of HARQ-ACK multiplexing of multiple DL transmissions according to Case 2 is described in connection with FIG. 3.

For both Case 1 and Case 2, HARQ-ACK multiplexing is needed to report HARQ-ACK of multiple slot(s) or min-slot(s) into one PUCCH or PUSCH within a PUCCH group. It is still an open issue on how to determine HARQ-ACK payload size when two or more PDSCH transmissions are associated with a single UL transmission using PUCCH or PUSCH (e.g., semi-static determination, dynamic determination based on DAI mechanism similar to LTE, etc.).

HARQ-ACK bundling is also described herein. For HARQ-ACK spatial bundling, NR supports higher layer configuration for spatial-domain bundling per PUCCH group. Bundling may be per cell, and the same configuration may apply to all the cells.

For non-CBG-based transmission, NR supports HARQ-ACK bundling in spatial domain for a NR-PDSCH transmission. If two codewords are transmitted in a slot or mini-slot, two HARQ-ACK bits can be reported if there is no spatial bundling, and one bit of HARQ-ACK is reported with spatial bundling.

For CBG-based transmission, a bundling method can be configured or applied in different manners. In one approach, bundling may be among CBGs with a transport block (TB). Another approach may include bundling the same CBG across transport blocks (TBs). Yet another approach may include bundling to a smaller number of HARQ-ACK bits than the configured number of CBGs.

Semi-static and dynamic codebook determination is also described herein. For NR, both semi-static and dynamic HARQ-ACK codebook sizes are supported by configuration for CA and non-CA cases. For non-CA case and semi-static codebook, if there is only one DL transmission to be reported, if CBG is not configured, the UE 102 may report one HARQ-ACK for a single codeword (CW) case or two codewords case with spatial bundling. The UE 102 may report 2 HARQ-ACK bits in the case of two codewords without spatial bundling.

If CBG is configured and the DL transmission is scheduled by regular or normal DL assignment DCI, for the case when the semi-static HARQ-ACK codebook with HARQ-ACK multiplexing which includes HARQ-ACK corresponding to all the CBGs (including the non-scheduled CBG(s)) is used, NACK may be reported for all the CBGs if TB CRC check is not passed while CB CRC check is passed for all the CBs. NACK may be mapped for the empty CBG index if the number of CBs for a TB is smaller than the configured maximum number of CBGs.

If CBG is configured and the DL transmission is scheduled by fallback DL assignment DCI, TB level HARQ-ACK feedback may be used (as if CBG is not configured).

For a CA case, semi-static HARQ-ACK codebook (per PUCCH group) is at least determined by a configured number of DL cells, the maximum number of TBs based on configuration for each DL cell and/or the configured number of CBGs per TB per configured DL cell.

For a CA case and dynamic HARQ-ACK codebook (per PUCCH group) without CBG configuration, HARQ-ACK codebook determination may be based on a counter DAI and total DAI. The LTE mechanism can be used as starting point. Each DL transmission in a slot or mini-slot may be counted as 1 in the DAI. The number of HARQ-ACK bits for each slot may be considered separately (e.g., determined by the max number of TBs based on configuration for each DL cell and the spatial bundling configuration). A counter DAI may be included in each DL scheduling DCI to indicate the number of DL transmissions so far in the same PUCCH group to be reported in a single UL report. A total DAI may be included in each DL scheduling DCI to indicate the total number of DL transmissions in the same PUCCH group to be reported in a single UL report. The same total DAI value may be indicated in all DL scheduling DCI for DL transmissions in the same PUCCH group to be reported in a single UL report.

For example, a periodicity for monitoring PDCCH (i.e., a DCI format(s)) that is used for scheduling of DL transmissions (i.e., PDSCH receptions by the UE 102) may be configured by the gNB 160 to the UE 102. The counter DAI (e.g., a value of a counter downlink assignment indicator field in the DCI format(s)) may be used for indicating the accumulative number of {a cell(s) (i.e., a serving cell(s) and/or the PDCCH monitoring period)}-pair(s) in which the PDSCH reception(s) associated with the DCI format(s) is present. Also, the total DAI (e.g., a value of a total downlink assignment indicator field in the DCI format(s)) may be used for indicating the total number of {a cell(s) (i.e., the serving cell(s) and/or the PDCCH monitoring period)}-pair(s) in which PDSCH reception associated with the DCI format(s) is present.

Some potential issues for HARQ-ACK multiplexing are described herein. The HARQ-ACK reporting conditions can be specified as follows. If only one DL transmission is detected on the PCell or PSCell of a PUCCH group, the HARQ-ACK reporting method for a single DL transmission is used. If the counter DAI and total DAI are included in the DL assignment DCI, both the counter DAI and the total DAI should be indicated as 1. If more than one DL transmission is detected on any cells or if at least one DL transmission is detected on a SCell, HARQ-ACK multiplexing should be applied. In this case, if the counter DAI and total DAI are included in the DL assignment DCI, at least one DL DCI is received with a total DAI greater than 1.

Even with the above mentioned HARQ-ACK reporting conditions, there are many potential issues to be solved for HARQ-ACK multiplexing cases. These cases include a non-CA case where HARQ-ACK multiplexing is required for multiple slot(s) or mini-slot(s) on a single CC. These cases also include a CA case where HARQ-ACK multiplexing is required for multiple slot(s) or mini-slot(s) on one or more CCs.

The potential issues for HARQ-ACK multiplexing exist as least for the following problems for both semi-static HARQ-ACK codebook and dynamic codebook determination. These problems include different CBG configurations on different cells and fallback DCI and regular/common DCI scheduling.

CBG configuration and HARQ-ACK codebook determination is described herein. In NR, a CC may be configured with or without CBG. Moreover, a CC may not be configured with CBG, and when CBG is configured, different CCs may be configured with a different maximum number of CBGs and different number of codewords. CBG level HARQ-ACK is considered if at least one CC is configured with CBG. For a CC that is not configured with CBG, TB level HARQ-ACK may be used.

For multiple DL transmission on a single CC and semi-static HARQ-ACK codebook, the codebook size can be determined at least by the maximum number of TBs based on configuration for the DL cell, and the configured number of CBGs per TB of the configured DL cell.

For a CA case and semi-static HARQ-ACK codebook (per PUCCH group), the codebook size can be determined at least by the configured number of DL cells, the maximum number of TBs based on configuration for each DL cell, and the configured number of CBGs per TB per configured DL cell. If more than one DL transmission is detected on any cells or if at least one DL transmission is detected on a SCell, the maximum HARQ-ACK bits has to be reported regardless the actual number of DL transmissions.

It should be noted that the number of HARQ-ACK bits reported for a DL transmission on different cells may be quite different. For example, if spatial bundling is not applied, the HARQ-ACK bits for a DL transmission on two different cells may be different if they are configured with a different number of codewords and/or a different number of CBGs per TB. A spatial bundling method can be separately configured for each CC, or the same spatial bundling configuration can be used on all CCs. The number of HARQ-ACK bit for each DL transmission can be more complicated if spatial bundling is applied. For example, bundling at the CBG-level across TBs or bundling at the CBG-level within a TB or bundling at both within a TB and across a TB.

This is not a very significant issue for semi-static HARQ-ACK codebook determination because the necessary information for the number of DL transmissions and the HARQ-ACK bits of a DL transmission on each cell are configured and known to the UE 102 and the gNB 160.

However, for dynamic codebook size determination, the codebook size may be determined at least by the counter DAI and total DAI of the DL assignments. If only slot or mini-slot level is counted in the DAI, as in LTE, if the number of HARQ-ACK bits reported for a DL transmission (no_HARQ-ACK_perDLTx) is the same for all configured cells, the HARQ-ACK codebook size can be determined based on the derived total DAI value multiplied by no_HARQ-ACK_perDLTx. Note that the counter DAI and total DAI bits may be cyclic reused to indicate different values. The actual values used for HARQ-ACK bits can be derived based on the combination of counter DAI and total DAI. If there is a missed counter DAI, the UE 102 can pad NACK (or '0') in all no_HARQ-ACK_perDLTx bits corresponding to the missed counter DAI.

However, if the number of HARQ-ACK bits reported for a DL transmission (no_HARQ-ACK_perDLTx) on a different cell is different, in the case of a misdetection of a DL assignment, the UE 102 may not know which cell is used for the missed DL transmission. Thus, the UE 102 may not know how many bits should be reported for the missed DL transmission. In this case, the codebook size becomes ambiguous.

To support a dynamic codebook size with CBG configurations, several methods may be implemented. A first method (Method 1) includes increasing the bits for counter DAI and total DAI to indicate the actual number of HARQ-ACK bits instead of the number of DL transmissions. In this case, the counter DAI may indicate the number of HARQ-ACK bits to be reported so far. The total DAI may indicate the total number of HARQ-ACK bits to be reported in a single UL reporting on PUCCH or PUSCH.

Compared with DAI values in LTE for the number of DL assignments, the number of DAI bits for the number of HARQ-ACK bits may be increased to accommodate multiple HARQ-ACK bits for CBGs of each TB.

For example, a periodicity for monitoring PDCCH (i.e., a DCI format(s)) that is used for scheduling of DL transmissions (i.e., PDSCH receptions by the UE 102) may be configured by the gNB 160 to the UE 102. The counter DAI (e.g., a value of a counter downlink assignment indicator field in the DCI format(s)) may be used for indicating the accumulative number of HARQ-ACK bits of {a cell(s) (i.e., a serving cell(s) and/or the PDCCH monitoring period)}-pair(s) in which the PDSCH reception(s) associated with the DCI format(s) is present. Also, the total DAI (e.g., a value of a total downlink assignment indicator field in the DCI format(s)) may be used for indicating the total number of HARQ-ACK bits of {a cell(s) (i.e., the serving cell(s) and/or the PDCCH monitoring period)}-pair(s) in which PDSCH reception associated with the DCI format(s) is present.

The number of the counter DAI and/or the number of the total DAI may be determined, at least, based on the number of configured serving cell(s); whether the serving cell(s) is configured with the CBG transmission "ON" (i.e., the CBG DL transmission, the UE configured to receive PDSCH(s) that include code block group(s) of a transport block); and/or the number of serving cell(s) configured with the CBG transmission.

However, this will make the number of DAI bits different for CBG and non-CBG configurations. In LTE, only subframes are counted in the counter DAI and total DAI by 2 bits. In NR, in the case of TB based HARQ-ACK reporting, the number of bits for the counter DAI and total DAI can be 2 bits, the same as in LTE. In the case of CBG based HARQ-ACK reporting with the number of HARQ-ACK bits in the DAI, the number of bits for the counter DAI and/or total DAI may be increased to 3 or 4 bits. It is also very difficult to adapt to large payload variations (e.g., since the total DAI bits are used in a cyclic shift manner, it is easy to make mistakes if the number of HARQ-ACK bits is large in the serving cells).

A second method (Method 2) includes configuring separately the number of HARQ-ACK bits to be reported for each DL transmission (no_HARQ-ACK_perDLTx) in a slot/min-slot. In this method, the counter DAI and total DAI only count at slot or mini-slot level, as in enhanced CA in LTE. In NR, if slot and/or mini-slot are counted in the counter DAI and total DAI, the number of bits for counter DAI and total DAI can still be 2 bits, the same as in LTE. This simplifies the DAI design. As described herein, if the number of HARQ-ACK bits reported for a DL transmission (no_HARQ-ACK_perDLTx) is different, the codebook size may not be determined in case of missed DCI detection with missing counter DAIs. On the other hand, if the number of HARQ-ACK bits reported for a DL transmission (no_HARQ-ACK_perDLTx) is the same for all configured cells, there will be no ambiguity on the codebook size.

Therefore, in Method 2, the number of HARQ-ACK bits (e.g., the maximum number of HARQ-ACK bits) to be reported for each DL transmission (no_HARQ-ACK_perDLTx) in a slot/min-slot may be configured by higher layer signaling (e.g., RRC signaling). The number of HARQ-ACK bits to be reported for each DL transmission (no_HARQ-ACK_perDLTx) in a slot/min-slot may be determined implicitly based on the existing configurations (e.g., the CBG configuration of each cell).

With no_HARQ-ACK_perDLTx parameter, in the case of dynamic codebook size determination, the number of HARQ-ACK bits in a UL transmission can be determined by the total DAI and the no_HARQ-ACK_perDLTx parameter with derived total DAI value multiplied by no_HARQ-ACK_perDLTx. Note that the counter DAI and total DAI bits are cyclic reused to indicate different values. The actual values used for HARQ-ACK bits can be derived based on the combination of the counter DAI and total DAI.

The no_HARQ-ACK_perDLTx parameter may also be applied for semi-static codebook cases. This can potentially reduce the codebook size if no_HARQ-ACK_perDLTx is smaller than the number of CBGs in each TB. For the semi-static codebook determination, the number of HARQ-ACK bits (e.g., the maximum number of HARQ-ACK bits) to be reported for an UL transmission (e.g., an UL slot/mini-slot, each UL transmission in a slot/mini-slot) may be configured by the higher layer signaling (e.g., the RRC signaling). The number of HARQ-ACK bits to be reported for an UL transmission may be determined implicitly based on the existing configuration. Thus, with semi-static codebook, the codebook size can be determined at least by the configured number of DL Cells, the maximum number of TBs based on configuration for each DL cell, and the configured number of CBGs per TB per configured DL cell, and the no_HARQ-ACK_perDLTx parameter.

The no_HARQ-ACK_perDLTx parameter may be very useful for CBG-based transmission, especially for CBG-based retransmission. Since a retransmission is likely to contain a smaller number of CBGs within a CB, in a case of dynamic codebook size for CBG HARQ-ACK feedback, a smaller no_HARQ-ACK_perDLTx parameter fits the codebook size better for a CBG-based transmission and may greatly reduce the codebook size in the case of HARQ-ACK multiplexing of multiple DL transmission for CA and non-CA cases.

The number of HARQ-ACK bits to be reported for each DL transmission (no_HARQ-ACK_perDLTx) (and/or the number of bits for a UL transmission) may be determined by one of the following (e.g., the following condition(s)): based on TB level HARQ-ACK feedback only; based on the maximum value of the product of the number of codewords and the number of CBGs of each TB (no_CWs*max_no_CBGs) of all configured cells; Based on the minimum value of the product of the number of codewords and the number of CBGs of each TB (no_CWs*max_no_CBGs) of all configured cells; based on a new RRC configured parameter no_HARQ-ACK_per-DLTx, where 1=<no_HARQ-ACK_perDLTx<=max (no_CWs*max_no_CBGs) of all configured cells.

In all cases with a configured/determined number of HARQ-ACK bits to be reported for each DL transmission (no_HARQ-ACK_perDLTx), if the configured/determined number of HARQ-ACK bits to be reported for each DL transmission (no_HARQ-ACK_perDLTx) is smaller than the number of HARQ-ACK bits reported for a DL transmission of a cell based on the CBG configuration, some HARQ-ACK bit bundling should be performed on the DL transmission of the cell before HARQ-ACK multiplexing. Namely, in a case that the number of HARQ-ACK bits determined (by the UE 102) based on the condition(s) of CBG configuration is larger than the number of the HARQ-ACK bits no_HARQ-ACK_perDLTx configured by the gNB 160, the bundling (e.g., a logical AND operation) may be applied to the HARQ-ACK bits.

The bundling may be performed at the CBG level within a TB, at the CBG level across TBs, or at the CBG level both within and across TBs. The bundling methods may be configured separately for each cell, or the same bundling method can be configured for all cells. The bundling may be performed in addition to the bundling methods applied to a cell to further reduce the HARQ-ACK bits to the configured number of HARQ-ACK bits to be reported for each DL transmission.

If the configured/determined number of HARQ-ACK bits to be reported for each DL transmission (no_HARQ-ACK_perDLTx) is larger than the number of HARQ-ACK bits reported for a DL transmission of a cell based on the CBG configuration, some HARQ-ACK bit expansion may be performed before HARQ-ACK multiplexing. In an approach, the expansion may be performed by padding with extra '0's or NACKs to fill the number of bits. In another approach, the expansion may be performed by HARQ-ACK bit repetition to fill the number of bits.

Fallback DCI and HARQ-ACK codebook determination is also described herein. Even if a UE 102 is configured with CBG-based retransmission, for the PDSCH scheduled by PDCCH using fallback DCI (e.g., a first DCI format), TB level HARQ-ACK feedback may be used at least for the case without HARQ-ACK multiplexing. This means that fallback DCI does not support CBG level HARQ-ACK feedback. For example, in a case that the UE 102 receives the DL transmissions (i.e., PDSCH) that is scheduled by using the fallback DCI format (i.e., the PDCCH with the fallback DCI format), the UE 102 may generate HARQ-ACK bit(s) (i.e., HARQ-ACK information) only for the transport block(s) in the PDSCH.

It is still unknown whether this operation is applied for the case with HARQ-ACK multiplexing for multiple DL transmissions with or without CA. The problem exists for both semi-static and dynamic codebook size determination. In other words, a problem is determining the behavior if a DL transmission with fallback DCI and regular DCI is detected within a PUCCH group (e.g., if at least 1 fallback DCI is detected).

If the same fallback rule is applied, the number of HARQ-ACK bits will be different for different DL transmissions scheduled with different DCI formats. If the number of HARQ-ACK bits is not changed, the fallback rule is violated. Thus, different behaviors are applied for HARQ-ACK multiplexing cases.

Different approaches may be considered for semi-static and dynamic codebook determination. For semi-static codebook size determination, the codebook size may be predetermined based on the configuration (e.g., at least by the configured number of DL Cells, the max number of TBs based on configuration for each DL cell, and the configured number of CBGs per TB per configured DL cell). Therefore, it is not good to dynamically change the codebook size based on the DL scheduling DCI formats. Furthermore, even for semi-static codebook size determination, a number of HARQ-ACK bits to be reported for each DL transmission (no_HARQ-ACK_perDLTx) in a slot/min-slot may be configured by higher layer signaling or implicitly derived. In such case, the codebook size may be determined by no_HARQ-ACK_perDLTx parameter instead of the number of CBGs parameter of a CC.

In a first approach (Approach 1), the codebook size is maintained, and CBG level is reported regardless DCI formats. If CBG is configured, and if more than one DL transmission is detected on any cells or if at least one DL transmission is detected on a SCell, HARQ-ACK multiplexing is applied. In this approach, the fallback DCI is treated the same as a regular DCI, and CBG level is reported regardless DCI formats. Thus, the codebook size is maintained the same as the semi-static configuration.

For example, if at least one serving cell(s) is configured with the CBG transmission "ON", for PDSCH receptions on more than one serving cell(s) indicated by a detection(s) of the DCI formats (i.e., the PDCCHs), the UE 102 may generate HARQ-ACK information bits for the transport block based on the CBG configuration(s) (e.g., the maximum number of CBG(s)). Alternatively, for a PDSCH reception on a secondary cell indicated by a detection of a DCI format (i.e., the PDCCH), the UE 102 may generate HARQ-ACK information bits for the transport block based on the CBG configuration(s) (e.g., the maximum number of CBG(s)).

Here, as described above, the DCI format(s) includes the fallback DCI format. Namely, in a case that (e.g., even if) the UE 102 detects the fallback DCI format, the UE 102 may generate, based on the CBG configuration(s), HARQ-ACK information bits for the transport block (i.e., DL transmissions).

In a second approach (Approach 2), TB level HARQ-ACK is reported, but the codebook size is maintained. If CBG is configured, and if more than one DL transmission is detected on any cells or if at least one DL transmission is detected on a SCell, HARQ-ACK multiplexing may be applied. In this approach, the fallback operation is applied to the DL transmission scheduled with a fallback DCI. Thus, TB level HARQ-ACK is generated for the given DL transmission. In order to keep the same codebook size as the semi-static configuration, the TB level HARQ-ACK is expanded to the configured HARQ-ACK bits for the given CC.

The expansion may be performed by padding with extra '0's or NACKs on the TB level HARQ-ACK to fill the number of bits to a CBG level HARQ-ACK feedback. The expansion may be performed on the TB level by HARQ-ACK bit repetition to fill the number of bits to a CBG level HARQ-ACK feedback.

For example, if at least one serving cell(s) is configured with the CBG transmission "ON", for PDSCH reception(s) on one or more serving cell(s) indicated by a detection of the fallback DCI format(s), the UE 102 may generate HARQ-ACK information bit(s) only for the transport block(s). For PDSCH receptions on more than one serving cell(s) indicated by a detection(s) of the DCI formats different from the fallback DCI format, the UE 102 may generate HARQ-ACK information bits for the transport block based on the CBG configuration(s) (e.g., the maximum number of CBG(s)). For a PDSCH reception on a secondary cell indicated by a detection of the DCI format different from the fallback DCI format, the UE 102 may generate HARQ-ACK information bits for the transport block based on the CBG configuration(s) (e.g., the maximum number of CBG(s)).

Namely, for example, in a case that the UE 102 detects the fallback DCI format, the UE 102 may generate one HARQ-ACK information bit for each transport block (i.e., DL transmissions). And, otherwise, the UE 102 may generate, based on the CBG configuration(s), HARQ-ACK information bits for the transport block (i.e., DL transmissions).

For dynamic codebook determination, multiple solutions can be considered to solve the potential issues. In a third approach (Approach 3), gNB scheduling restrictions may be implemented. The gNB 160 should avoid using different DCI formats (i.e., fallback DAI and regular DCI, for DL transmissions to be reported together in a single UL reporting on PUCCH or PUSCH in the same PUCCH group). From the UE's perspective, the UE 102 is not expected to detect different DCI formats (i.e., fallback DAI and regular DCI) for DL transmissions to be reported together in a single UL reporting on PUCCH or PUSCH in the same PUCCH group. With the given restriction, either semi-static or dynamic codebook size can be configured. Either method 1 or method 2 above for CBG-based HARQ-ACK reporting can be adopted or configured.

In a fourth approach (Approach 4), fallback mode HARQ-ACK reporting may be implemented. In fallback mode, a fallback DCI can override regular DCI (i.e., fallback operation should be used if the UE 102 detects at least one fallback DCI on any CCs). With this approach, TB level HARQ-ACK is used on all DL transmissions from all CCs if the UE 102 detects at least one fallback DCI on any CCs. This can greatly reduce the codebook size compared with a CBG level HARQ-ACK feedback.

For example, if at least one serving cell(s) is configured with the CBG transmission "ON", if the UE 102 detects at least one fallback DCI format, the UE 102 may generate HARQ-ACK information bit(s) only for the transport block for PDSCH reception(s) on the serving cell(s). In other words, if the UE 102 detects at least one fallback DCI format, the UE 102 may generate HARQ-ACK information bit(s) only for the transport block for all (any) PDSCH reception(s) on all (any) serving cell(s). Additionally or alternatively, if the UE 102 detects at least one fallback DCI format, the UE 102 may generate one HARQ-ACK information bit for each transport block for all (any) PDSCH reception(s) on all (any) serving cell(s).

In a case that the UE 102 detects at least one fallback DCI format, the UE 102 may generate TB-level HARQ-ACK information bits for all DL receptions. Namely, even if one or more serving cell(s) is configured with the CBG transmission "ON", the UE 102 may generate one HARQ-ACK information bit for each transport block in each PDSCH (e.g., each DL transmission received on the one or more serving cells).

However, there is some ambiguity if the UE 102 misses at least one DCI for DL transmission. The miss detection can be determined by missing counter DAI values and a mismatch with the total DAI. The UE 102 may not know whether the missing DCI is a fallback DCI or regular DCI.

In one method, in a more conservative way, the UE 102 may assume a fallback DCI is used in a missing DCI, and the same fallback operation is applied. Therefore, if the UE 102 misses at least one DCI for DL transmission, TB level HARQ-ACK is used on all DL transmissions from all CCs.

In another method, if there is no fallback DCI detected and there is at least one missed DCI, the UE 102 may assume a regular DCI format is used in a missing DCI, and may perform HARQ-ACK normally based on CBG level HARQ-ACK feedback.

In all cases, since the gNB 160 does not know what may be missed by a UE 102, the gNB 160 may perform blind decoding on at least two hypothesizes for CB level and CBG level feedback.

In a fifth approach (Approach 5), fallback mode is supported by DCI, but the number of HARQ-ACK bits for the given DL transmission is not changed. If CBG is configured, and if more than one DL transmission is detected on any cells or if at least one DL transmission is detected on a SCell, HARQ-ACK multiplexing is applied. In this approach, the fallback operation is applied to the DL transmission scheduled with a fallback DCI. Thus, TB level HARQ-ACK is generated for the given DL transmission. In order to keep the same codebook size as regular DCI scheduling, the TB level HARQ-ACK is expanded to the configured HARQ-ACK bits for the given CC.

The expansion may be performed by padding with extra '0's or NACKs on the TB level HARQ-ACK to fill the number of bits to a CBG level HARQ-ACK feedback. The expansion may be performed by on the TB level HARQ-ACK bit repetition to fill the number of bits to a CBG level HARQ-ACK feedback.

In a sixth approach (Approach 6), fallback mode is supported by DCI, and the codebook size is dynamically changed. If CBG is configured, and if more than one DL transmission is detected on any cells or if at least one DL transmission is detected on a SCell, HARQ-ACK multiplexing may be applied. In this approach, the fallback operation is applied to the DL transmission scheduled with a fallback DCI. Thus, TB level HARQ-ACK is generated for the given DL transmission, and the number of HARQ-ACK bits generated for a DL transmission scheduled by a fallback DCI would be different from the number of HARQ-ACK bits generated for a DL transmission scheduled by a regular DCI.

If Method 1 above is used (i.e. the actual number of HARQ-ACK bits are indicated in the counter DAI and total DAI), the fallback operation can reduce the codebook size dynamically since the gNB 160 can indicate the correct number of counter DAI and total DAI in each DL assignment. Even if some DAI is missed, the UE 102 may pad NACK to the corresponding bits in the HARQ-ACK codebook.

On the other hand, if the counter DAI and total DAI only indicates the number of DL transmissions, the fallback operation can reduce the codebook size dynamically with some potential issues. If DCI of all scheduled transmissions are detected correctly, the UE can report the HARQ-ACK with the desired codebook size. If there is at least one DCI missed by the UE, the UE 102 may not know which DCI format is used on the missed DCI. Thus, the UE 102 may not know the number of bits to be added to the codebook.

Therefore, to avoid ambiguity between the UE 102 and the eNB 160, Method 2 above may be used for dynamic codebook size (i.e., configure separately the number of HARQ-ACK bits to be reported for each DL transmission (no_HARQ-ACK_perDLTx) in a slot/min-slot). The number of HARQ-ACK bits to be reported for each DL transmission (no_HARQ-ACK_perDLTx) in a slot/min-slot may be configured by higher layer signaling (e.g., RRC signaling). The number of HARQ-ACK bits to be reported for each DL transmission (no_HARQ-ACK_perDLTx) in a slot/min-slot may be determined implicitly based on the existing configurations (e.g., the CBG configuration of each cell).

With the no_HARQ-ACK_perDLTx parameter, in a case of dynamic codebook size determination, the number of HARQ-ACK bits in a UL transmission can be determined by the total DAI and the no_HARQ-ACK_perDLTx parameter with the derived total DAI multiplied by no_HARQ-ACK_perDLTx. Note that the counter DAI and total DAI bits are cyclic reused to indicate different values. The actual values used for HARQ-ACK bits can be derived based on the combination of the counter DAI and total DAI.

The no_HARQ-ACK_perDLTx parameter may also be applied for semi-static codebook cases. This can potentially reduce the codebook size if no_HARQ-ACK_perDLTx is smaller than the number of CBGs in each TB. For semi-static codebook determination, the number of HARQ-ACK bits (e.g., the maximum number of HARQ-ACK bits) to be reported for an UL transmission (e.g., an UL slot/mini-slot, each UL transmission in a slot/mini-slot) may be configured by the higher layer signaling (e.g., the RRC signaling). The number of HARQ-ACK bits to be reported for an UL transmission may be determined implicitly based on the existing configuration. Thus, with a semi-static codebook, the codebook size can be determined at least by the configured number of DL cells, the maximum number of TBs based on configuration for each DL cell, and the configured number of CBGs per TB per configured DL cell, and the no_HARQ-ACK_perDLTx parameter.

As described above, the number of HARQ-ACK bits to be reported for each DL transmission (no_HARQ-ACK_perDLTx) (and/or the number of bits for a UL transmission) may be determined by one of the following: based on TB level HARQ-ACK feedback only; based on the maximum value of the product of the number of codeword and the number of CBGs of each TB (no_CWs*max_no_CBGs) of all configured cells; based on the minimum value of the product of the number of codeword and the number of CBGs of each TB (no_CWs*max_no_CBGs) of all configured cells; and/or based on a new RRC configured parameter no_HARQ-ACK_perDLTx, where 1=<no_HARQ-ACK_perDLTx<=max (no_CWs*max_no_CBGs) of all configured cells.

Also, in all cases with a configured/determined number of HARQ-ACK bits to be reported for each DL transmission no_HARQ-ACK_perDLTx, if the configured/determined number of HARQ-ACK bits to be reported for each DL transmission (no_HARQ-ACK_perDLTx) is smaller than the number of HARQ-ACK bits reported for a DL transmission of a cell based on the CBG configuration, some HARQ-ACK bit bundling should be performed on the DL transmission of the cell before HARQ-ACK multiplexing. Namely, in a case that the number of HARQ-ACK bits determined (by the UE 102) based on the condition(s) of CBG configuration is larger than the number of the HARQ-ACK bits no_HARQ-ACK_perDLTx configured by the gNB 160, the bundling (e.g., a logical AND operation) may be applied to the HARQ-ACK bits.

The bundling may be performed at CBG level within a TB; CBG level across TBs; or CBG level both within and across TBs. The bundling methods may be configured separately for each cell, or the same bundling method can be configured for all cells. The bundling may be performed in addition to the bundling methods applied to a cell to further reduce the HARQ-ACK bits to the configured number of HARQ-ACK bits to be reported for each DL transmission.

If the configured/determined number of HARQ-ACK bits to be reported for each DL transmission (no_HARQ-ACK_perDLTx) is larger than the number of HARQ-ACK bits reported for a DL transmission of a cell based on the CBG configuration, some HARQ-ACK bit expansion may be performed before HARQ-ACK multiplexing.

The expansion may be performed by padding with extra '0's or NACKs to fill the number of bits. The expansion may be performed by HARQ-ACK bit repetition to fill the number of bits.

The fallback operation may be applied to the DL transmission scheduled with a fallback DCI. Thus, TB level HARQ-ACK is generated for the given DL transmission (e.g., one HARQ-ACK information bit is generated for each transport block). In order to fit the configured/determined number of HARQ-ACK bits to be reported for each DL transmission (and/or the UL transmission), TB level HARQ-ACK may be expanded to the configured/determined number of HARQ-ACK bits to be reported for each DL transmission.

The expansion may be performed by padding with extra '0's or NACKs on the TB level HARQ-ACK to fill the number of bits to the configured/determined number of HARQ-ACK bits to be reported for each DL transmission (no_HARQ-ACK_perDLTx). The expansion may be performed by on the TB level HARQ-ACK bit repetition to fill the number of bits to the configured/determined number of HARQ-ACK bits to be reported for each DL transmission (no_HARQ-ACK_perDLTx).

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB HARQ-ACK multiplexing module 194. The gNB HARQ-ACK multiplexing module 194 may implement codebook determination of HARQ-ACK multiplexing with fallback DCI and CBG configurations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
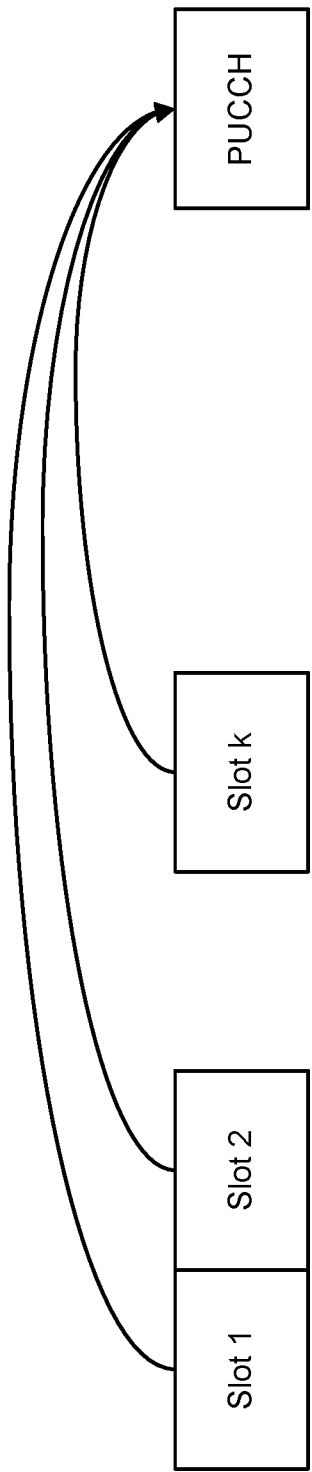
FIG. 2 illustrates an example of HARQ-ACK multiplexing of multiple DL transmissions according to a first case (Case 1)

FIG. 2 illustrates an example of HARQ-ACK multiplexing of multiple DL transmissions according to a first case (Case 1). In Case 1, HARQ-ACK multiplexing may be performed for multiple slots or mini-slots on a single carrier (CC). In Case 1, the HARQ-ACK of multiple slots or mini-slots on a single carrier (CC) may be reported on a single UL PUCCH or PUSCH transmission. It is still an open issue on how to determine HARQ-ACK payload size when two or more PDSCH transmissions are associated with a single UL transmission using PUCCH or PUSCH. The slot(s) or mini-slot(s) may be continuous or dis-continuous in timing based on the HARQ-ACK timing indication of each DL transmission. Note that DL transmissions in the slots or mini-slots may be on the same bandwidth part (BWP) or different BWPs of the CC. The HARQ-ACK feedback should be reported in an active BWP on a PUCCH of the PCell of PSCell of the PUCCH group, or on a PUSCH.

In this example, multiple DL transmissions on one CC are linked so a single PUCCH/PUSCH reporting.

Figure 3:
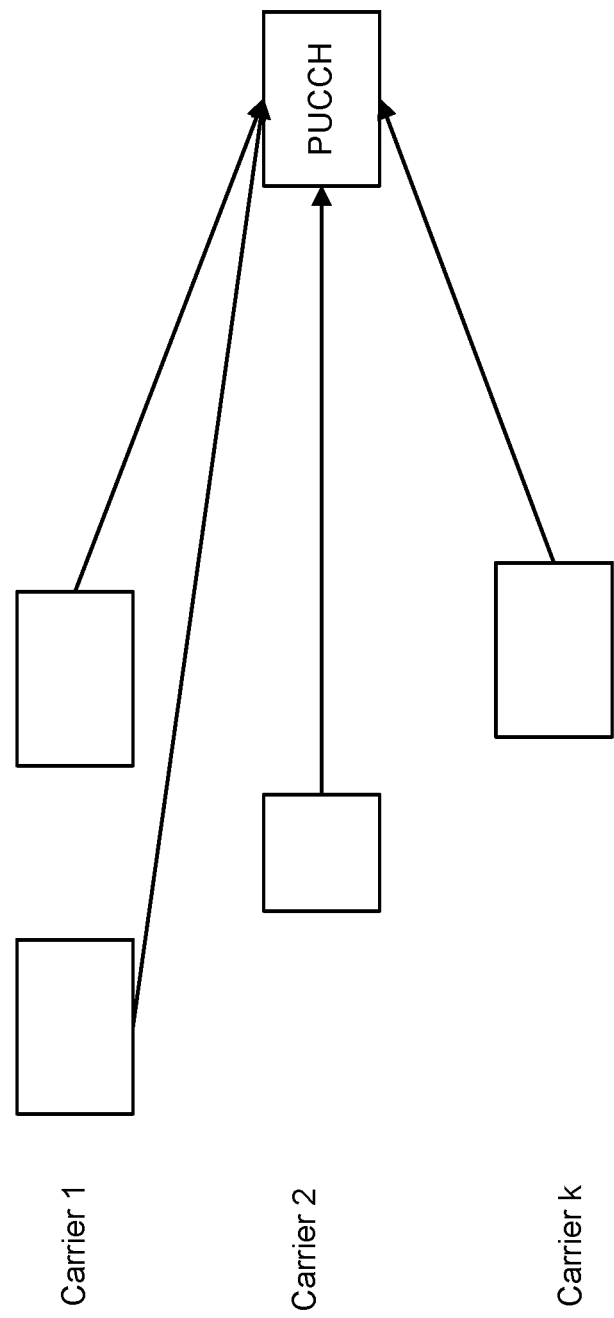
FIG. 3 illustrates an example of HARQ-ACK multiplexing of multiple DL transmissions according to a second case (Case 2)

FIG. 3 illustrates an example of HARQ-ACK multiplexing of multiple DL transmissions according to a second case (Case 2). In Case 2, HARQ-ACK multiplexing may be performed for slots or mini-slots on multiple carriers (CCs) (e.g., carrier aggregation). For Case 2, the HARQ-ACK of multiple slots or mini-slots on one or more CCs may be reported on a single UL PUCCH or PUSCH transmission. NR supports a large number of CCs, each CC may have no DL transmission, one or more transmission linked to a single PUCCH or PUSCH reporting for HARQ-ACK feedback. Different CCs may have the same or different numerologies. Note that DL transmissions in the slots or mini-slots may be on the same bandwidth part (BWP) of a CC or different BWPs of a CC. The HARQ-ACK feedback should be reported in an active BWP on a PUCCH of the PCell of PSCell of the PUCCH group, or on a PUSCH.

In this example, multiple DL transmissions on one or more CCs are linked so a single PUCCH/PUSCH reporting.

Figure 4:
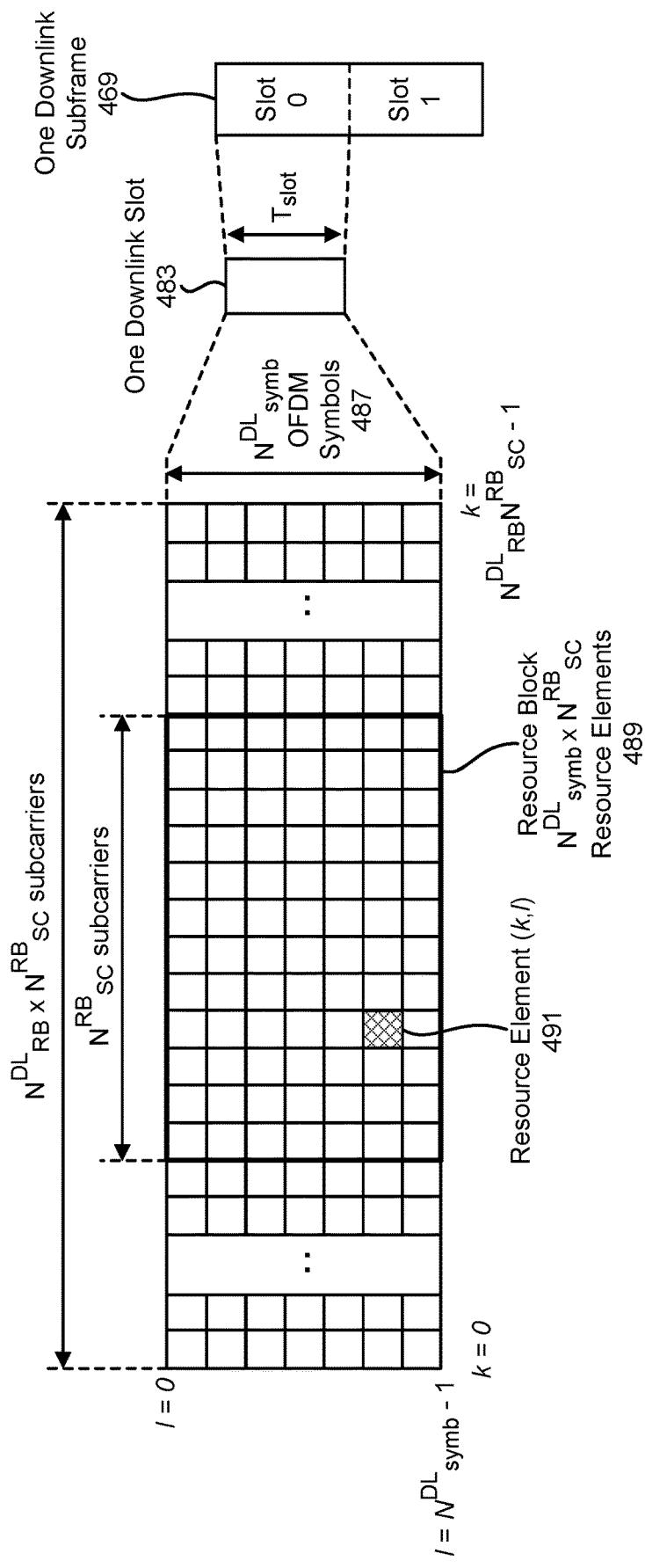
FIG. 4 is a diagram illustrating one example of a resource grid for the downlink.

FIG. 4 is a diagram illustrating one example of a resource grid for the downlink. The resource grid illustrated in FIG. 4 may be utilized in some implementations of the systems and methods disclosed herein. More detail regarding the resource grid is given in connection with FIG. 1.

In FIG. 4, one downlink subframe 469 may include two downlink slots 483. $N^{DL}_{RB}$ is downlink bandwidth configuration of the serving cell, expressed in multiples of $N^{RB}_{sc}$, where $N^{RB}_{sc}$ is a resource block 489 size in the frequency domain expressed as a number of subcarriers, and $N^{DL}_{symb}$ is the number of OFDM symbols 487 in a downlink slot 483. A resource block 489 may include a number of resource elements (RE) 491.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 491 may be the RE 491 whose index 1 fulfils $1 \geq 1_{data,start}$ and/or $1_{data,end} \geq 1$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and/are indices in the frequency and time domains, respectively. While downlink subframes in one component carrier (CC) are discussed herein, downlink subframes are defined for each CC and downlink subframes are substantially in synchronization with each other among CCs.

Figure 5:
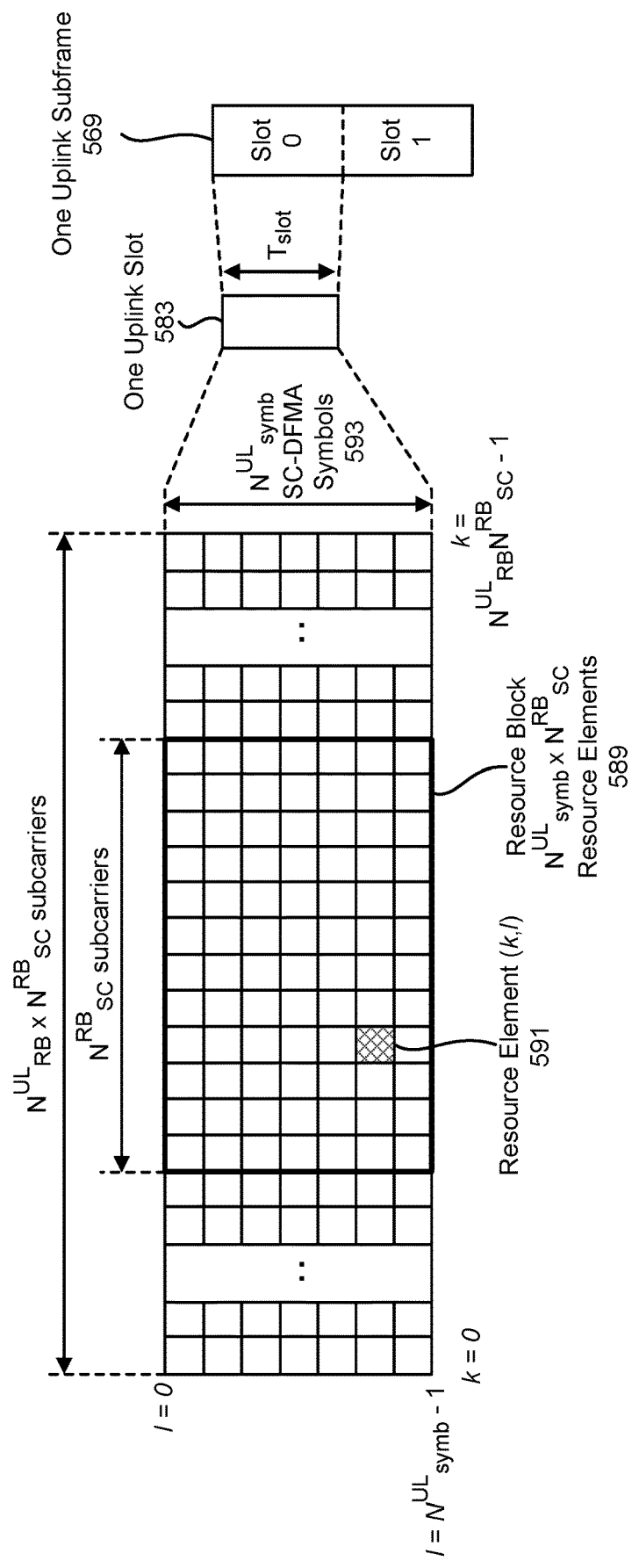
FIG. 5 is a diagram illustrating one example of a resource grid for the uplink.

FIG. 5 is a diagram illustrating one example of a resource grid for the uplink. The resource grid illustrated in FIG. 5 may be utilized in some implementations of the systems and methods disclosed herein. More detail regarding the resource grid is given in connection with FIG. 1.

In FIG. 5, one uplink subframe 569 may include two uplink slots 583. $N_{UL}^{RB}$ is uplink bandwidth configuration of the serving cell, expressed in multiples of $N^{RB}_{sc}$, where $N^{RB}_{sc}$ is a resource block 589 size in the frequency domain expressed as a number of subcarriers, and $N^{UL}_{symb}$ is the number of SC-FDMA symbols 593 in an uplink slot 583. A resource block 589 may include a number of resource elements (RE) 591.

For a PCell, $N^{UL}_{RB}$ is broadcast as a part of system information. For an SCell (including an LAA SCell), $N^{UL}_{RB}$ is configured by a RRC message dedicated to a UE 52.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 6:
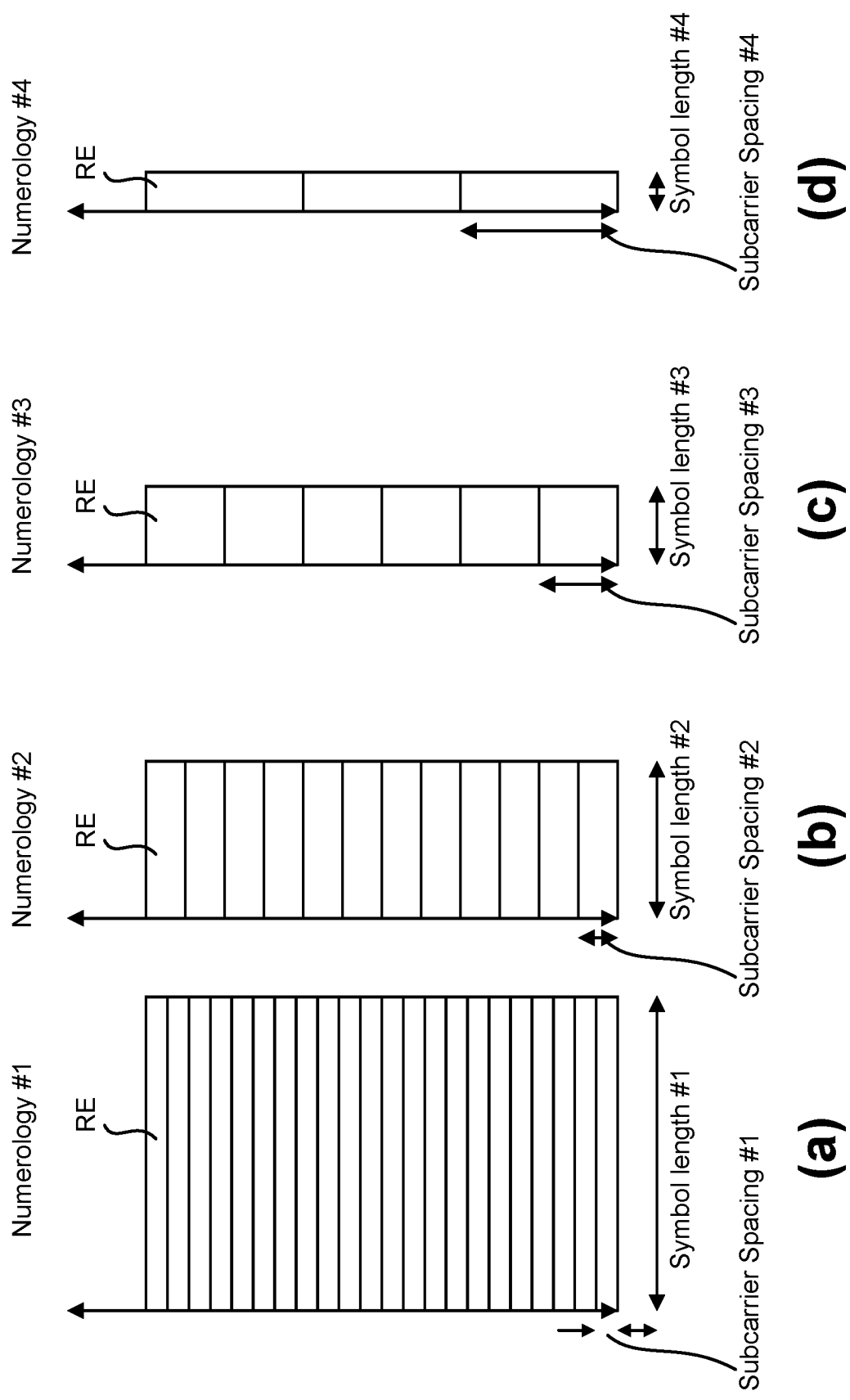
FIG. 6 shows examples of several numerologies.

FIG. 6 shows examples of several numerologies. The numerology #1 may be a basic numerology. For example, a RE of the basic numerology is defined with subcarrier spacing of 15 kHz in frequency domain and 2048 Ts+CP length (e.g. 160 Ts or 144 Ts) in time domain, where Ts denotes a baseband sampling time unit defined as 1/(15000*2048) seconds. For the i-th numerology, the subcarrier spacing may be equal to $15*2^i$ and the effective OFDM symbol length $2048*2^{-i}$*Ts. It may cause the symbol length is $2048*2^{-i}$*Ts+CP length (e.g. $160*2^{-i}$*Ts or $144*2^{-i}$*Ts). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

Figure 7:
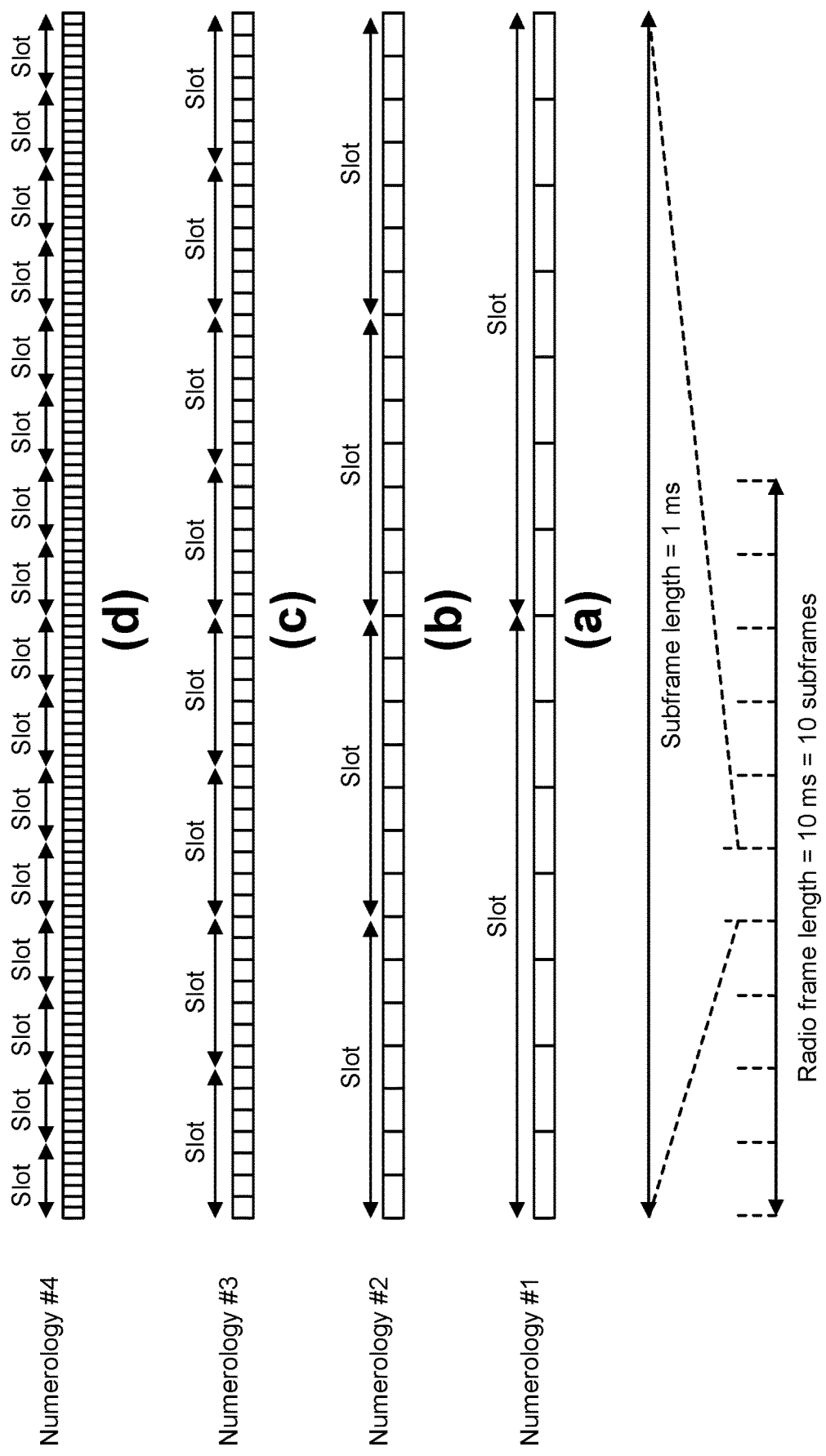
FIG. 7 shows examples of subframe structures for the numerologies that are shown in FIG. 6.

FIG. 7 shows examples of subframe structures for the numerologies that are shown in FIG. 6. Given that a slot consists of $N^{DL}_{symb}$ (or $N^{UL}_{symb}$)=7 symbols, the slot length of the i+1-th numerology is a half of the one for the i-th numerology, and eventually the number of slots in a subframe (i.e., 1 ms) becomes double. It may be noted that a radio frame may consists of 10 subframes, and the radio frame length may be equal to 10 ms.

Figure 8:
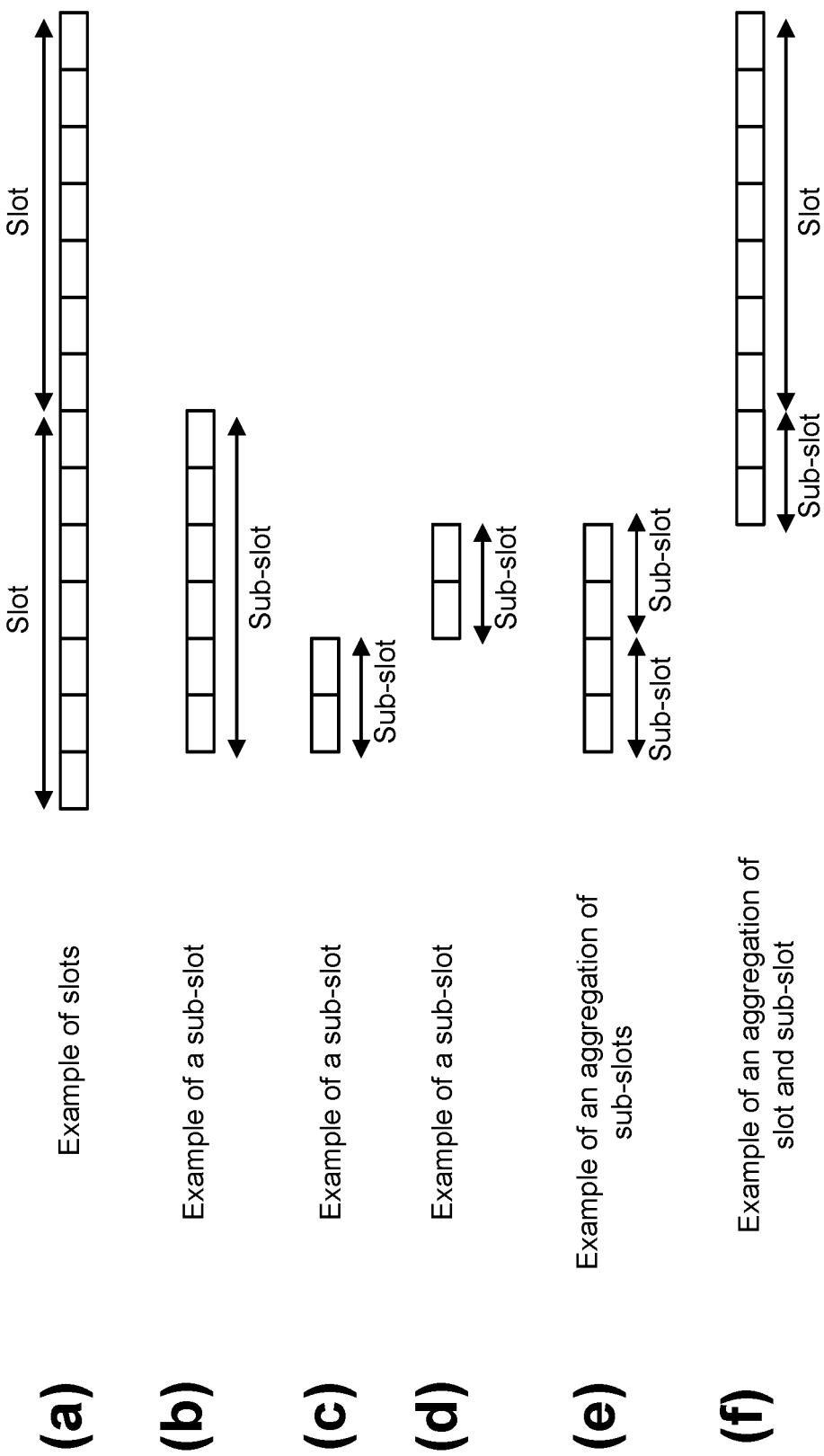
FIG. 8 shows examples of slots and sub-slots.

FIG. 8 shows examples of slots and sub-slots. If sub-slot is not configured by higher layer, the UE 102 and the eNB/gNB 160 may only use a slot as a scheduling unit. More specifically, a given transport block may be allocated to a slot. If the sub-slot is configured by higher layer, the UE 102 and the eNB/gNB 160 may use the sub-slot as well as the slot. The sub-slot may consist of one or more OFDM symbols. The maximum number of OFDM symbols that constitute the sub-slot may be $N^{DL}_{symb}-1$ (or $N^{UL}_{symb}-1$).

The sub-slot length may be configured by higher layer signaling. Alternatively, the sub-slot length may be indicated by a physical layer control channel (e.g. by DCI format).

The sub-slot may start at any symbol within a slot unless it collides with a control channel. There could be restrictions of mini-slot length based on restrictions on starting position. For example, the sub-slot with the length of $N^{DL}_{symb}-1$ (or $N^{UL}_{symb}-1$) may start at the second symbol in a slot. The starting position of a sub-slot may be indicated by a physical layer control channel (e.g. by DCI format). Alternatively, the starting position of a sub-slot may be derived from information (e.g. search space index, blind decoding candidate index, frequency and/or time resource indices, PRB index, a control channel element index, control channel element aggregation level, an antenna port index, etc.) of the physical layer control channel which schedules the data in the concerned sub-slot.

In cases when the sub-slot is configured, a given transport block may be allocated to either a slot, a sub-slot, aggregated sub-slots or aggregated sub-slot(s) and slot. This unit may also be a unit for HARQ-ACK bit generation.

Figure 9:
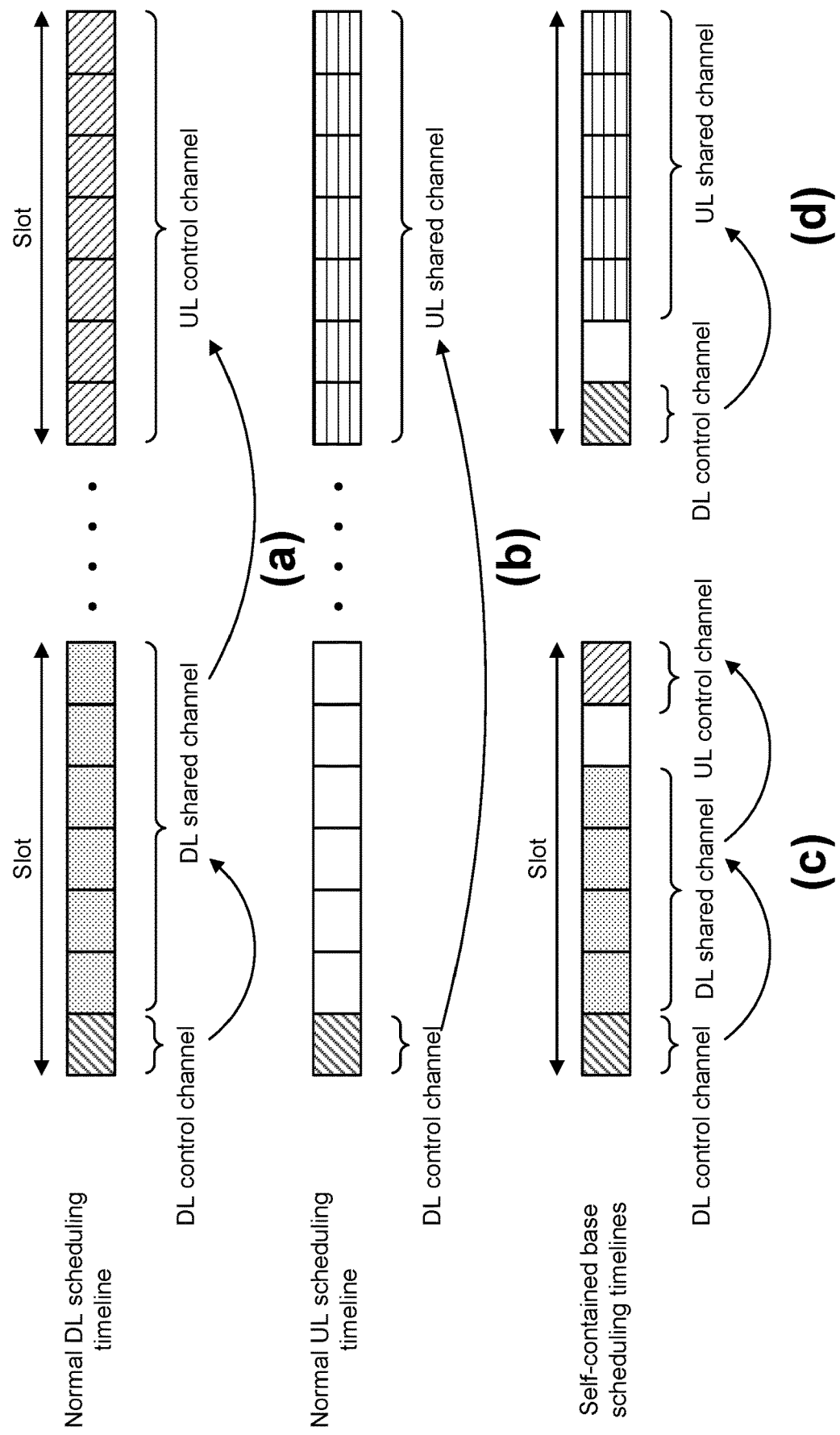
FIG. 9 shows examples of scheduling timelines.

FIG. 9 shows examples of scheduling timelines. For a normal DL scheduling timeline, DL control channels are mapped the initial part of a slot. The DL control channels schedule DL shared channels in the same slot. HARQ-ACKs for the DL shared channels (i.e. HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g. the DL assignment DCI format, the UL grant DCI format, or another DCI format such as UE-common signaling DCI format which may be monitored in common search space).

For a self-contained base DL scheduling timeline, DL control channels are mapped to the initial part of a slot. The DL control channels schedule DL shared channels in the same slot. HARQ-ACKs for the DL shared channels are reported in UL control channels which are mapped at the ending part of the slot. For a self-contained base UL scheduling timeline, DL control channels are mapped to the initial part of a slot. The DL control channels schedule UL shared channels in the same slot. For these cases, the slot may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g. PDSCH, PUSCH, PUCCH, etc.).

Figure 10:
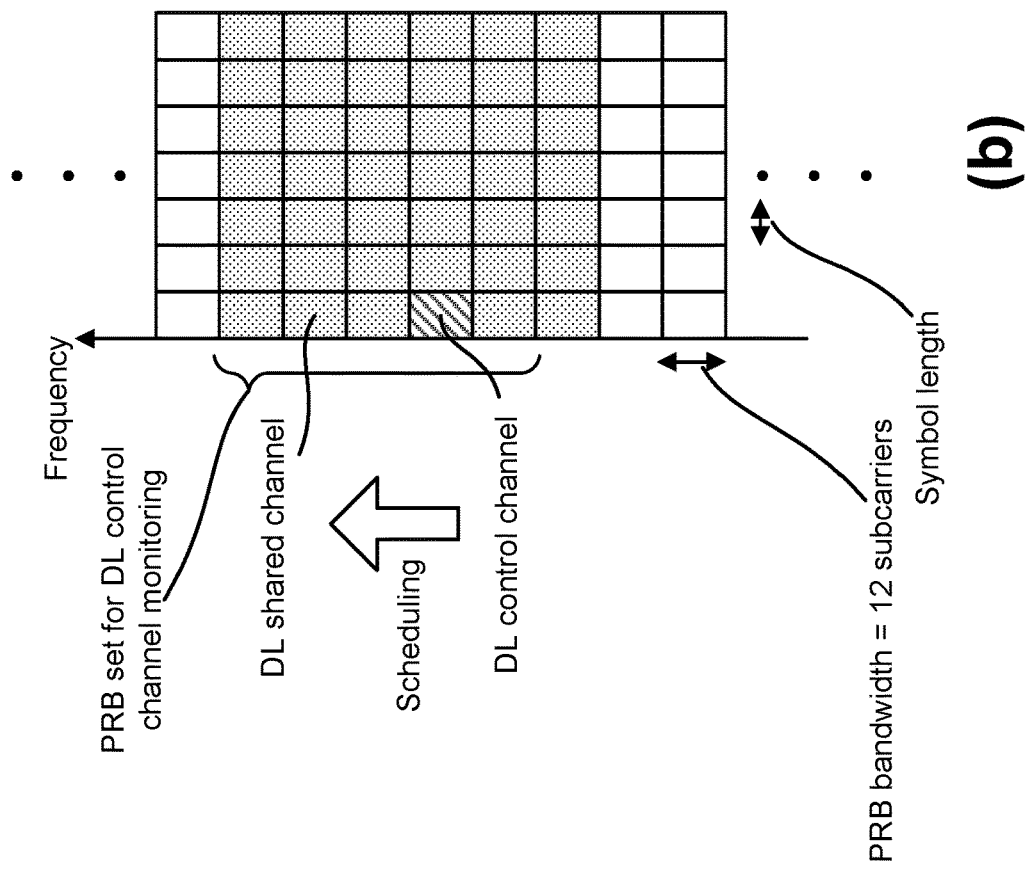
FIG. 10 shows examples of downlink (DL) control channel monitoring regions.
Figure 10:
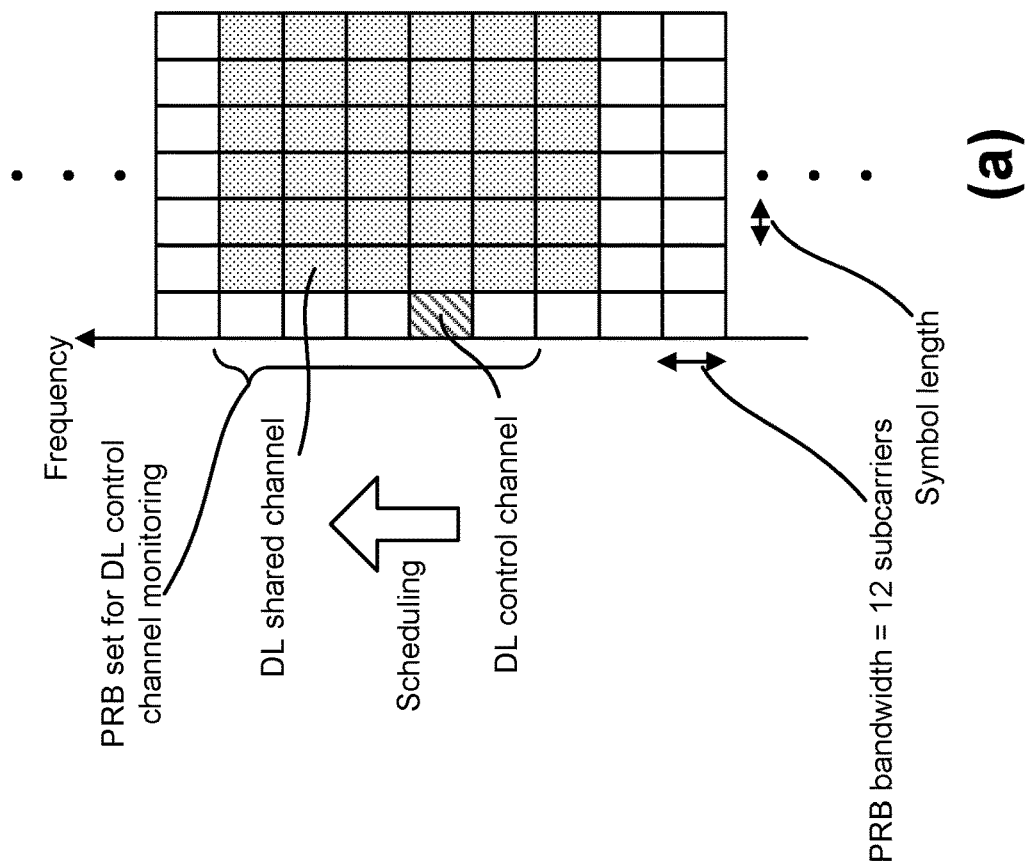

FIG. 10 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DM-RS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 11:
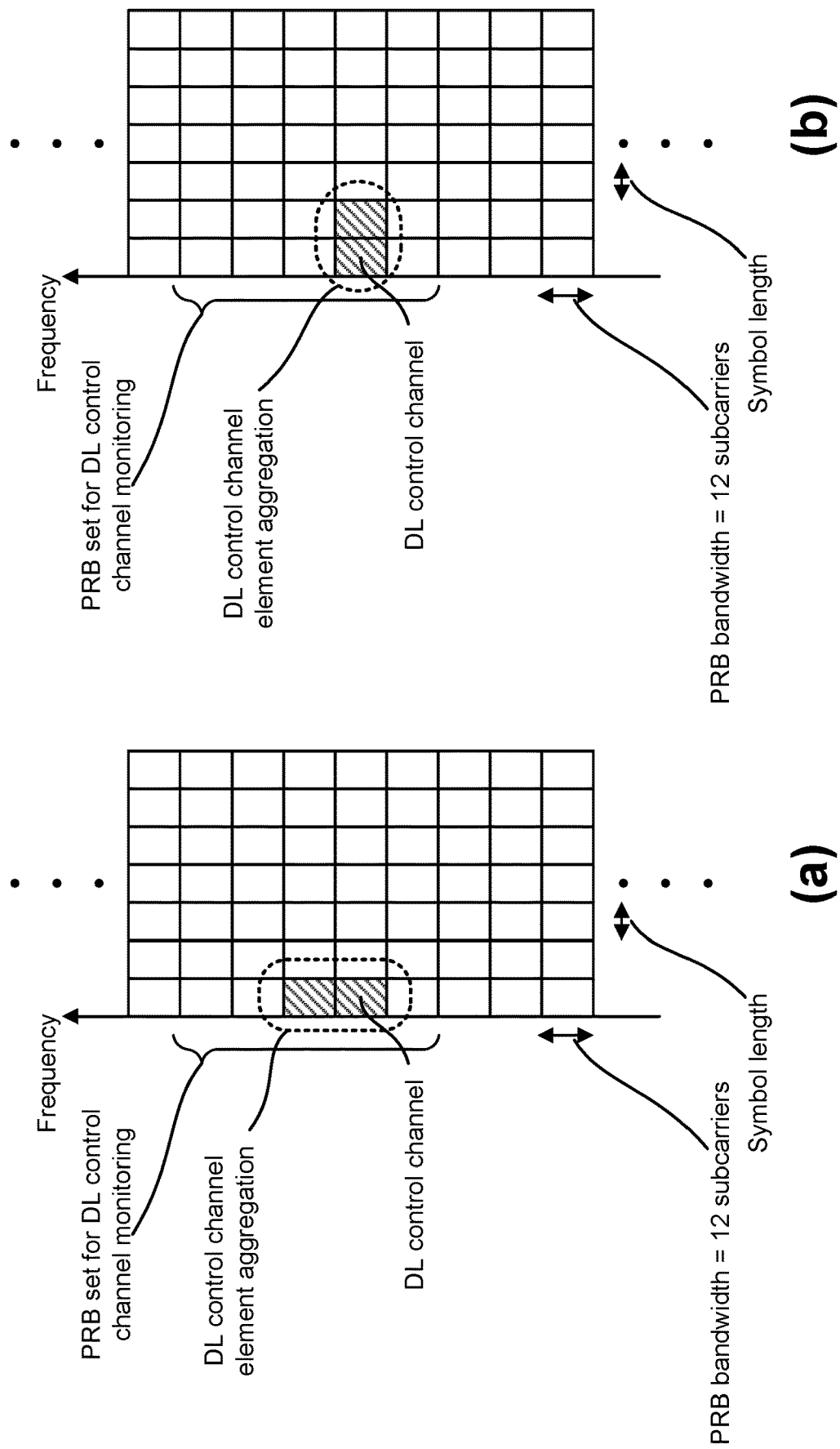
FIG. 11 shows examples of DL control channel which consists of more than one control channel elements.

FIG. 11 shows examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 12:
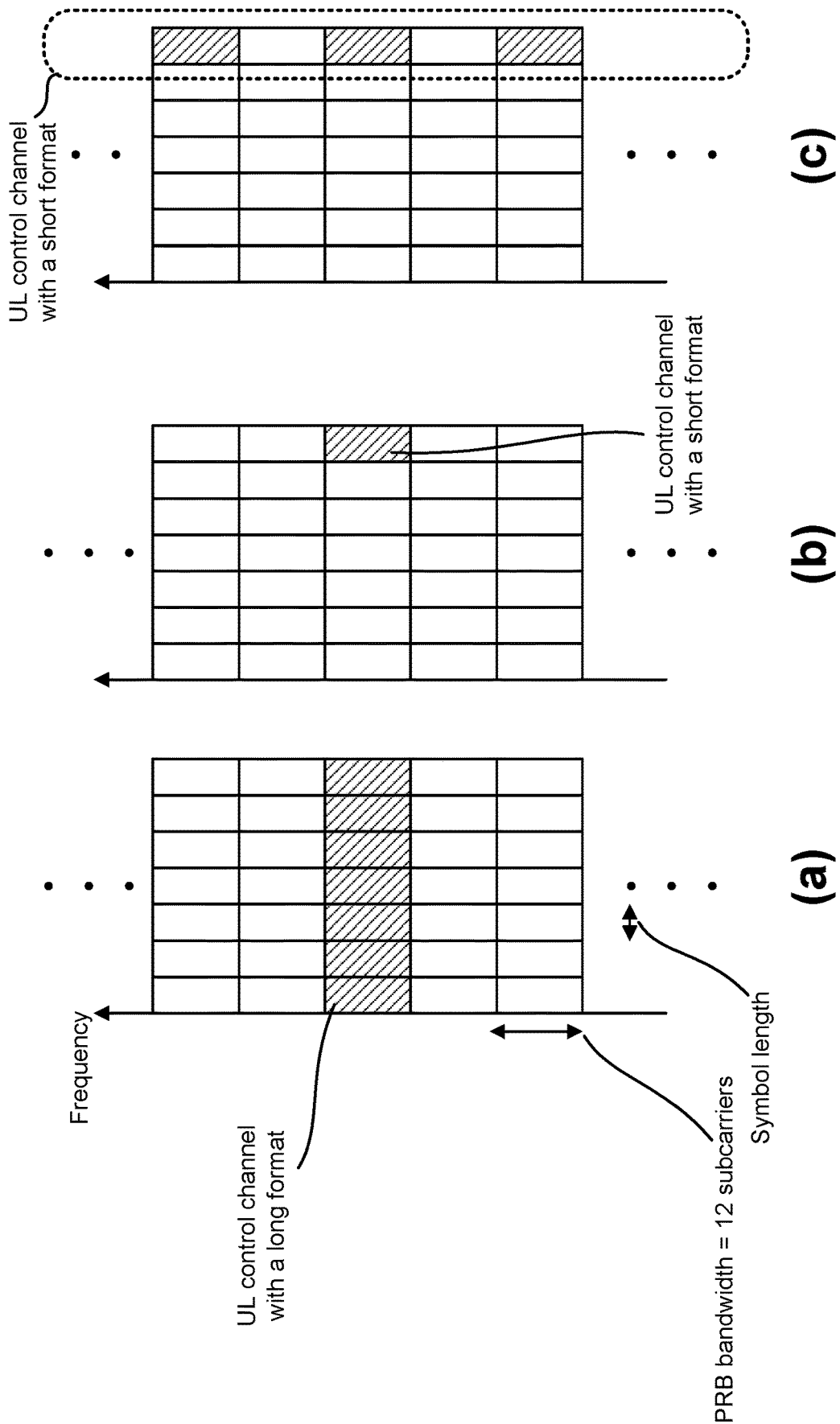
FIG. 12 shows examples of uplink (UL) control channel structures.

FIG. 12 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 13:
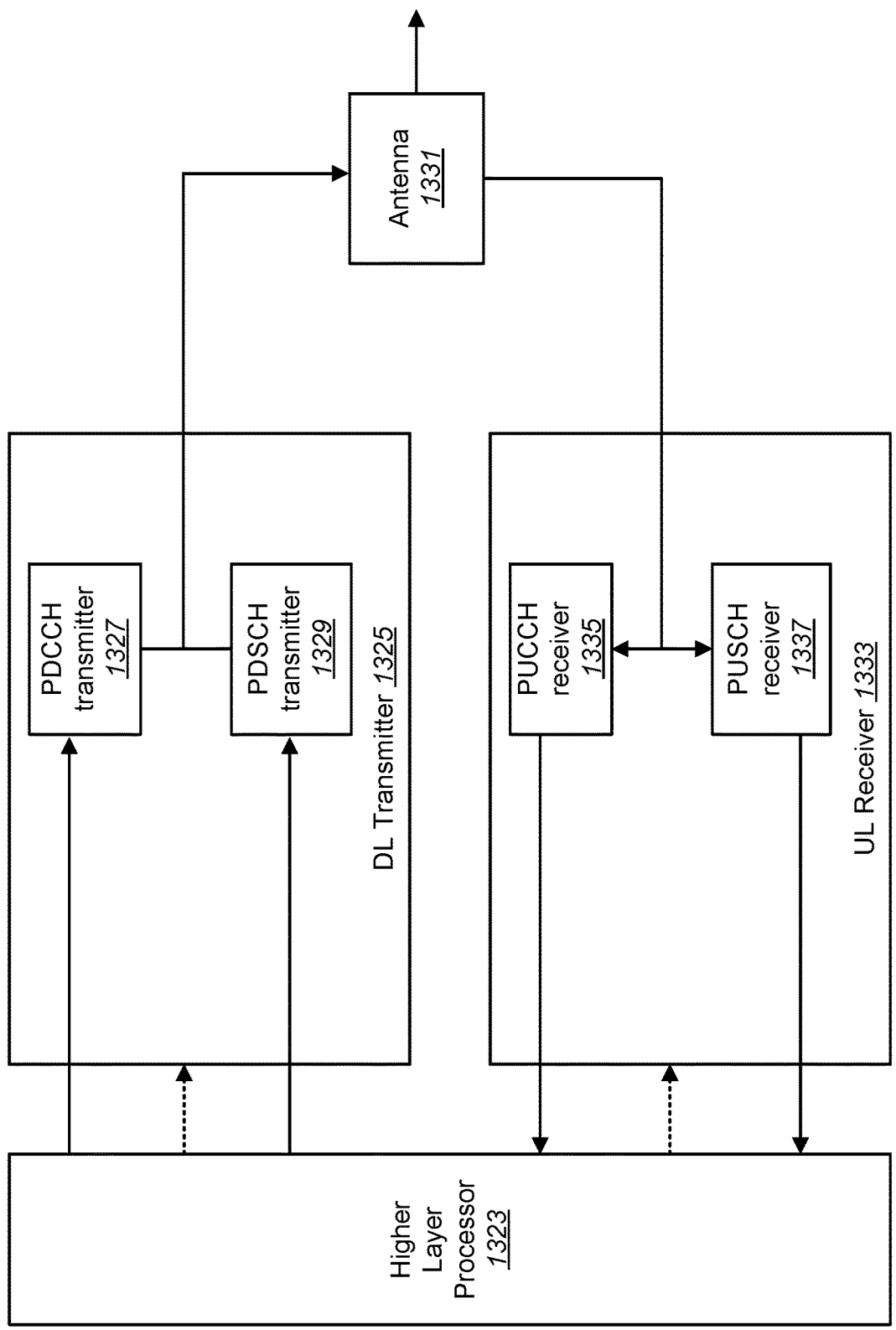
FIG. 13 is a block diagram illustrating one implementation of a gNB.

FIG. 13 is a block diagram illustrating one implementation of a gNB 1360. The gNB 1360 may include a higher layer processor 1323, a DL transmitter 1325, a UL receiver 1333, and antennas 1331. The DL transmitter 1325 may include a PDCCH transmitter 1327 and a PDSCH transmitter 1329. The UL receiver 1333 may include a PUCCH 1335 receiver and a PUSCH receiver 1337. The higher layer processor 1323 may manage physical layer's behaviors (the DL transmitter's and the UL receiver's behaviors) and provide higher layer parameters to the physical layer. The higher layer processor 1323 may obtain transport blocks from the physical layer. The higher layer processor 1323 may send/acquire higher layer messages such as an RRC message and MAC message to/from a UE's higher layer. The higher layer processor 1323 may provide the PDSCH transmitter 1329 transport blocks and provide the PDCCH transmitter 1327 transmission parameters related to the transport blocks. The UL receiver 1333 may receive multiplexed uplink physical channels and uplink physical signals via receiving antennas 1331 and de-multiplex them. The PUCCH receiver 1335 may provide the higher layer processor UCI. The PUSCH receiver 1337 may provide the higher layer processor received transport blocks.

Figure 14:
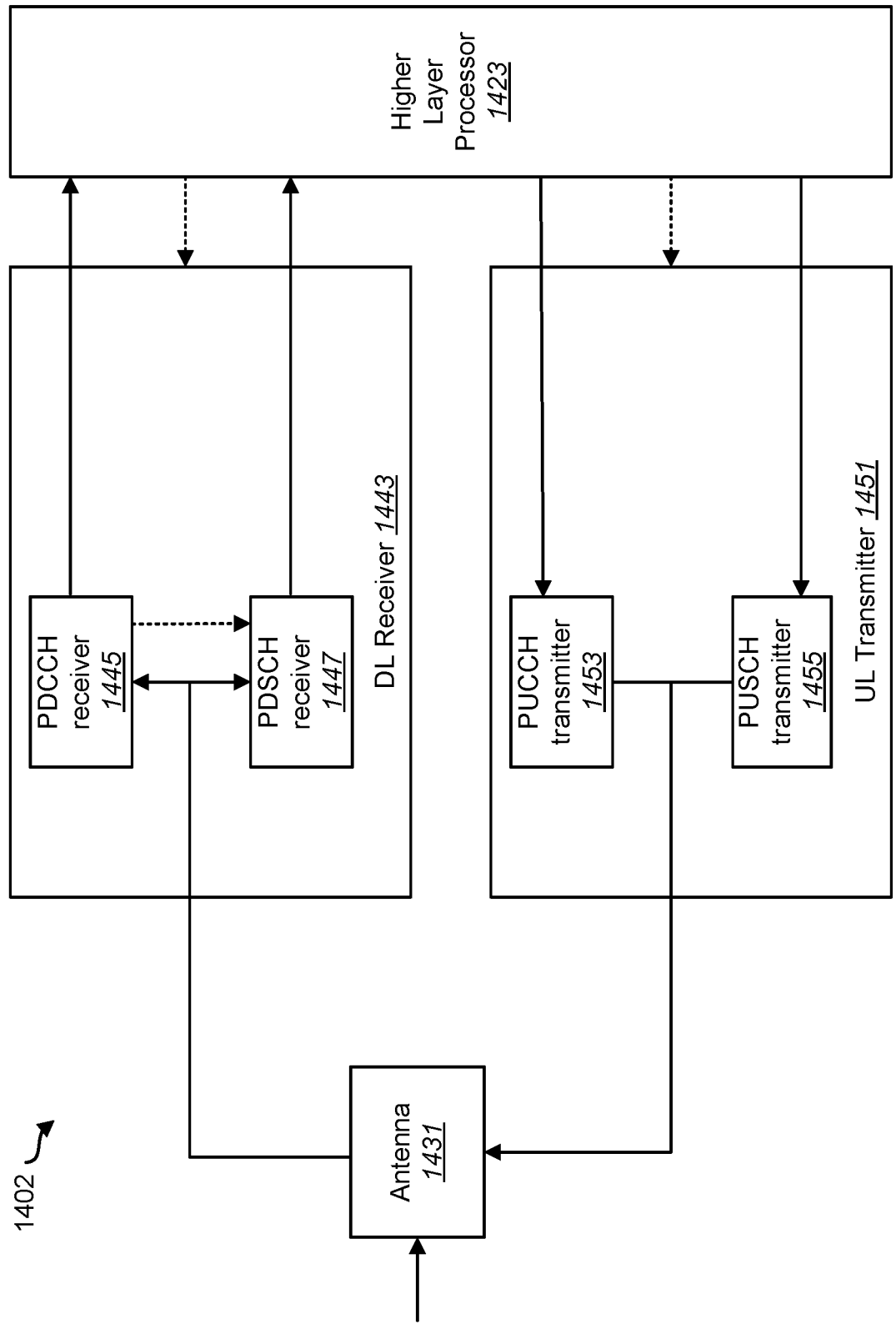
FIG. 14 is a block diagram illustrating one implementation of a UE.

FIG. 14 is a block diagram illustrating one implementation of a UE 1402. The UE 1402 may include a higher layer processor 1423, a UL transmitter 1451, a DL receiver 1443, and antennas 1431. The UL transmitter 1451 may include a PUCCH transmitter 1453 and a PUSCH transmitter 1455. The DL receiver 1443 may include a PDCCH receiver 1445 and a PDSCH receiver 1447. The higher layer processor 1423 may manage physical layer's behaviors (the UL transmitter's and the DL receiver's behaviors) and provide higher layer parameters to the physical layer. The higher layer processor 1423 may obtain transport blocks from the physical layer. The higher layer processor 1423 may send/acquire higher layer messages such as an RRC message and MAC message to/from a UE's higher layer. The higher layer processor 1423 may provide the PUSCH transmitter 1455 transport blocks and provide the PUCCH transmitter 1453 UCI. The DL receiver 1443 may receive multiplexed downlink physical channels and downlink physical signals via receiving antennas 1431 and de-multiplex them. The PDCCH receiver 1445 may provide the higher layer processor 1423 DCI. The PDSCH receiver 1447 may provide the higher layer processor 1423 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 15:
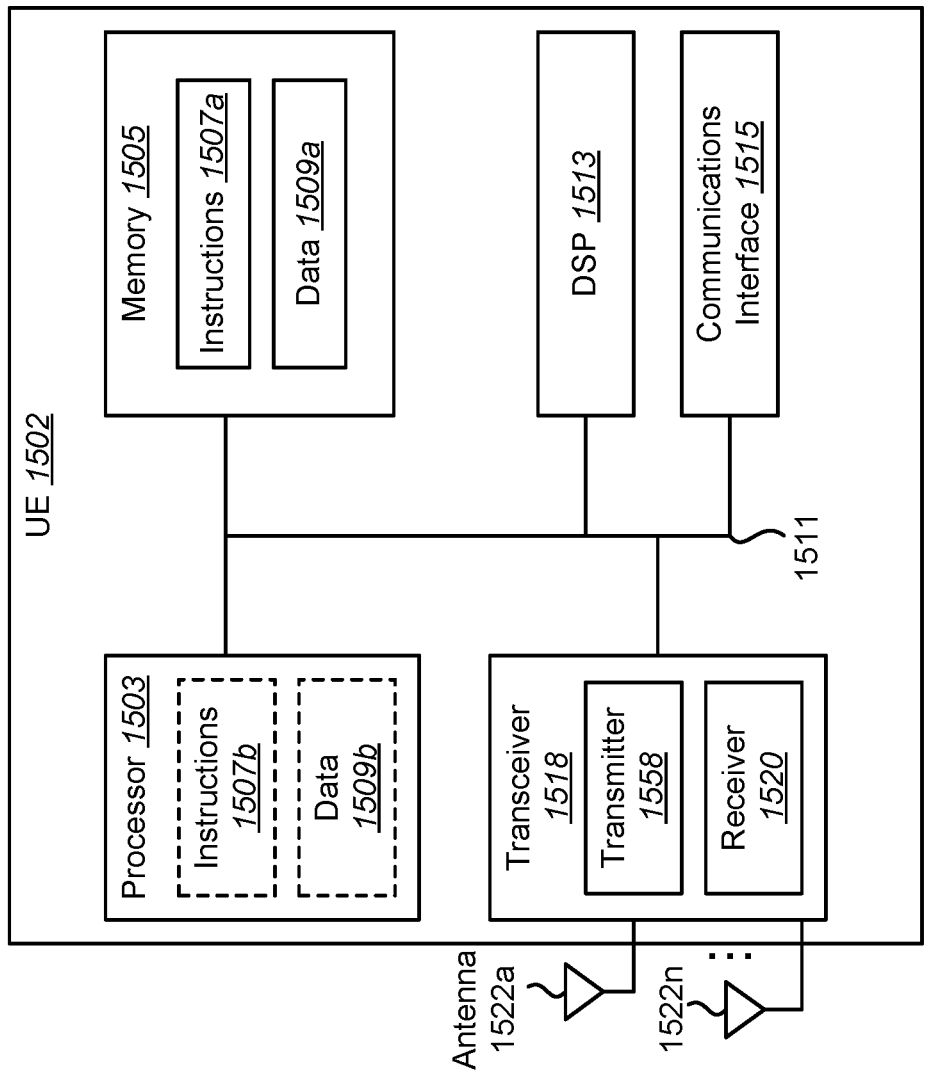
FIG. 15 illustrates various components that may be utilized in a UE.

FIG. 15 illustrates various components that may be utilized in a UE 1502. The UE 1502 described in connection with FIG. 15 may be implemented in accordance with the UE 102 described in connection with FIG. 1. The UE 1502 includes a processor 1503 that controls operation of the UE 1502. The processor 1503 may also be referred to as a central processing unit (CPU). Memory 1505, which may include read-only memory (ROM), random access memory (RAM), a combination of the two or any type of device that may store information, provides instructions 1507a and data 1509a to the processor 1503. A portion of the memory 1505 may also include non-volatile random access memory (NVRAM). Instructions 1507b and data 1509b may also reside in the processor 1503. Instructions 1507b and/or data 1509b loaded into the processor 1503 may also include instructions 1507a and/or data 1509a from memory 1505 that were loaded for execution or processing by the processor 1503. The instructions 1507b may be executed by the processor 1503 to implement the methods described herein.

The UE 1502 may also include a housing that contains one or more transmitters 1558 and one or more receivers 1520 to allow transmission and reception of data. The transmitter(s) 1558 and receiver(s) 1520 may be combined into one or more transceivers 1518. One or more antennas 1522a-n are attached to the housing and electrically coupled to the transceiver 1518.

The various components of the UE 1502 are coupled together by a bus system 1511, which may include a power bus, a control signal bus and a status signal bus, in addition to a data bus. However, for the sake of clarity, the various buses are illustrated in FIG. 15 as the bus system 1511. The UE 1502 may also include a digital signal processor (DSP) 1513 for use in processing signals. The UE 1502 may also include a communications interface 1515 that provides user access to the functions of the UE 1502. The UE 1502 illustrated in FIG. 15 is a functional block diagram rather than a listing of specific components.

Figure 16:
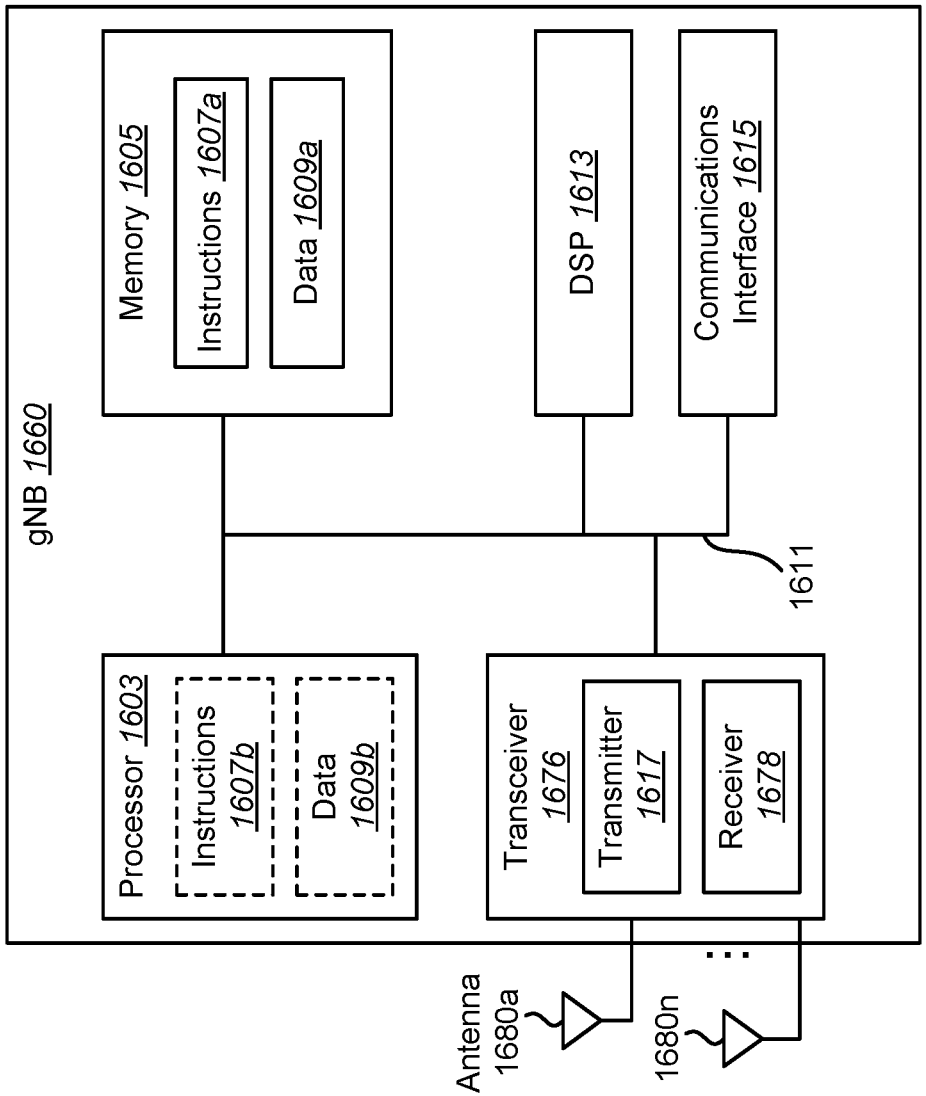
FIG. 16 illustrates various components that may be utilized in a gNB.

FIG. 16 illustrates various components that may be utilized in a gNB 1660. The gNB 1660 described in connection with FIG. 16 may be implemented in accordance with the gNB 160 described in connection with FIG. 1. The gNB 1660 includes a processor 1603 that controls operation of the gNB 1660. The processor 1603 may also be referred to as a central processing unit (CPU). Memory 1605, which may include read-only memory (ROM), random access memory (RAM), a combination of the two or any type of device that may store information, provides instructions 1607a and data 1609a to the processor 1603. A portion of the memory 1605 may also include non-volatile random access memory (NVRAM). Instructions 1607b and data 1609b may also reside in the processor 1603. Instructions 1607b and/or data 1609b loaded into the processor 1603 may also include instructions 1607a and/or data 1609a from memory 1605 that were loaded for execution or processing by the processor 1603. The instructions 1607b may be executed by the processor 1603 to implement the methods described herein.

The gNB 1660 may also include a housing that contains one or more transmitters 1617 and one or more receivers 1678 to allow transmission and reception of data. The transmitter(s) 1617 and receiver(s) 1678 may be combined into one or more transceivers 1676. One or more antennas 1680a-n are attached to the housing and electrically coupled to the transceiver 1676.

The various components of the gNB 1660 are coupled together by a bus system 1611, which may include a power bus, a control signal bus and a status signal bus, in addition to a data bus. However, for the sake of clarity, the various buses are illustrated in FIG. 16 as the bus system 1611. The gNB 1660 may also include a digital signal processor (DSP) 1613 for use in processing signals. The gNB 1660 may also include a communications interface 1615 that provides user access to the functions of the gNB 1660. The gNB 1660 illustrated in FIG. 16 is a functional block diagram rather than a listing of specific components.

Figure 17:
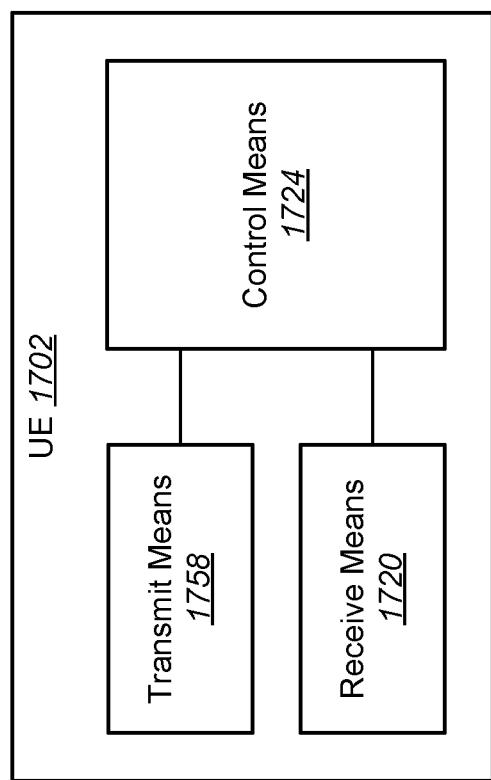
FIG. 17 is a block diagram illustrating one implementation of a UE in which systems and methods for codebook determination of HARQ-ACK multiplexing with fallback DCI and CBG configurations may be implemented.

FIG. 17 is a block diagram illustrating one implementation of a UE 1702 in which systems and methods for codebook determination of HARQ-ACK multiplexing with fallback DCI and CBG configurations may be implemented. The UE 1702 includes transmit means 1758, receive means 1720 and control means 1724. The transmit means 1758, receive means 1720 and control means 1724 may be configured to perform one or more of the functions described in connection with FIG. 1 above. FIG. 20 above illustrates one example of a concrete apparatus structure of FIG. 17. Other various structures may be implemented to realize one or more of the functions of FIG. 1. For example, a DSP may be realized by software.

Figure 18:
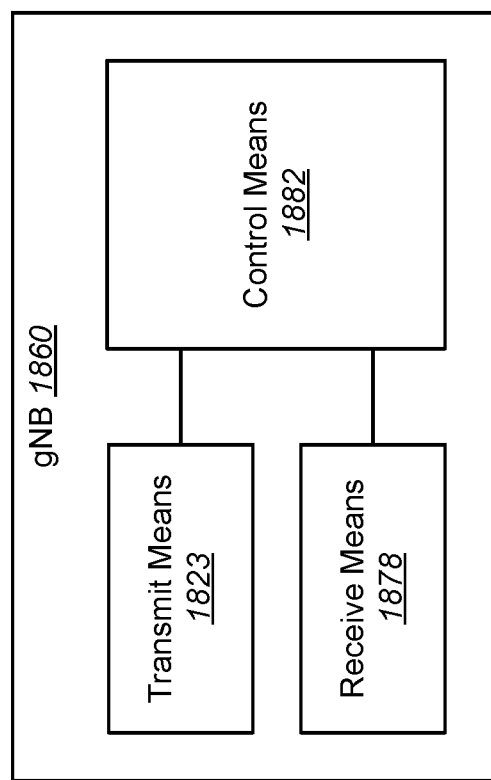
FIG. 18 is a block diagram illustrating one implementation of a gNB in which systems and methods for codebook determination of HARQ-ACK multiplexing with fallback DCI and CBG configurations may be implemented.

FIG. 18 is a block diagram illustrating one implementation of a gNB 1860 in which systems and methods for codebook determination of HARQ-ACK multiplexing with fallback DCI and CBG configurations may be implemented. The gNB 1860 includes transmit means 1817, receive means 1878 and control means 1882. The transmit means 1817, receive means 1878 and control means 1882 may be configured to perform one or more of the functions described in connection with FIG. 1 above. FIG. 21 above illustrates one example of a concrete apparatus structure of FIG. 18. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
   a processor; and
   memory in electronic communication with the processor, wherein instructions stored in the memory are executable to:
   determine a HARQ-ACK codebook size for one or more slots on multiple carriers (CCs); and
   send a single HARQ-ACK report for the one or more slots based on the HARq-ACK codebook size determined by whether semi-static codebook or dynamic HARQ-ACK codebook is used, wherein:
   a transport block (TB) level HARQ-ACK includes a HARQ-ACK bit for a TB, and a code block group (CBG) level HARQ-ACK includes HARQ-ACK bits for CBGs of the TB; and
   in a case that a DL transmission is scheduled with a fallback DCI, the TB level HARQ-ACK is generated for the DL transmission and the TB level HARQ-ACK is expanded to the number of bits of a CBG level HARQ-ACK by repetition of HARQ-ACK bit(s) of the TB HARQ-ACK.

2. A base station (gNB), comprising:
   a processor; and
   memory in electronic communication with the processor, wherein instructions stored in the memory are executable to:
   receive a single HARQ-ACK report from a user equipment (UE) for one or more slots on multiple carriers (CCs) based on a HARQ-ACK codebook size determined by whether semi-static or dynamic HARQ-ACK codebook is used, wherein:
   a transport block (TB) level HARQ-ACK includes a HARQ-ACK bit for a TB, and a code block group (CBG) level HARQ-ACK includes HARQ-ACK bits for CBG of the TB; and
   in a case that a DL transmission is scheduled with a fallback DCI, the TB level HARQ-ACK is generated for the DL transmission and the TB level HARQ-ACK is expanded to the number of bits of a CBG level HARQ-ACK by repetition of HARQ-ACK bit(s) of the TB HARQ-ACK.

3. A method performed by a user equipment (UE), the method comprising:
   determining a HARQ-ACK codebook size for one or more slots on multiple carriers (CCs); and
   sending a single HARQ-ACK report for the one or more slots based on the HARQ-ACK codebook size determined by whether semi-static codebook or dynamic HARQ-ACK codebook is used, wherein:
   a transport block (TB) level HARQ-ACK includes a HARQ-ACK bit for a TB, and a code block group (CBG) level HARQ-ACK includes HARQ-ACK bits for CBGs of the TB; and
   in a case that a DL transmission is scheduled with a fallback DCI, the TB level HARQ-ACK is generated for the DL transmission and the TB level HARQ-ACK is expanded to the number of bits of a CBG level HARQ-ACK by repetition of HARQ-ACK bit(s) of the TB HARQ-ACK.

4. A method performed by a base station (gNB), the method comprising:
   receiving a single HARQ-ACK report from a UE for one or more slots on multiple carriers (CCs) based on a HARQ-ACK codebook size determined by whether semi-static codebook or dynamic HARQ-ACK codebook is used, wherein:

a transport block (TB) level HARQ-ACK includes a HARQ-ACK bit for a TB, and a code block group (CBG) level HARQ-ACK includes HARQ-ACK bits for CBGs of the TB; and in a case that a DL transmission is scheduled with a fallback DCI, the TB level HARQ-ACK is generated for the DL transmission and the TB level HARQ-ACK is expanded to the number of bits of a CBG level HARQ-ACK by repetition of HARQ-ACK bit(s) of the TB HARQ-ACK.

* * * * *